US012662900B2

(12) United States Patent
El Mallawany

(10) Patent No.: US 12,662,900 B2
(45) Date of Patent: Jun. 23, 2026

(54) SUBSURFACE SAFETY VALVE INCLUDING AN ELECTROPERMANENT MAGNET AND TARGET

(71) Applicant: Halliburton Energy Services, Inc., Houston, TX (US)

(72) Inventor: Ibrahim El Mallawany, Al-Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/616,775

(22) Filed: Mar. 26, 2024

(65) Prior Publication Data

US 2025/0305388 A1     Oct. 2, 2025

(51) Int. Cl.
*E21B 34/06* (2006.01)
*E21B 41/00* (2006.01)
*F16K 31/06* (2006.01)

(52) U.S. Cl.
CPC ........ *E21B 34/066* (2013.01); *E21B 41/0007* (2013.01); *F16K 31/0644* (2013.01); *F16K 31/0675* (2013.01); *E21B 2200/05* (2020.05)

(58) Field of Classification Search
CPC . E21B 34/066; F16K 31/0644; F16K 31/0675
See application file for complete search history.

(56) References Cited

U.S. PATENT DOCUMENTS

| | | | |
|---|---|---|---|
| 11,248,441 B2 | 2/2022 | Vick, Jr. et al. | |
| 11,643,905 B2 | 5/2023 | Vick, Jr. et al. | |
| 2002/0108747 A1* | 8/2002 | Dietz | E21B 34/066 166/66.4 |
| 2016/0240298 A1 | 8/2016 | Troy et al. | |
| 2016/0265309 A1 | 9/2016 | Vick, Jr. | |
| 2016/0356121 A1 | 12/2016 | Hill, Jr. et al. | |
| 2020/0095843 A1* | 3/2020 | Vick, Jr. | F16K 5/08 |
| 2020/0392758 A1 | 12/2020 | Elsmark | |
| 2022/0341285 A1* | 10/2022 | Werkheiser | E21B 34/08 |
| 2023/0018892 A1 | 1/2023 | Chouzenoux et al. | |
| 2024/0068335 A1* | 2/2024 | Kjøsnes | E21B 43/14 |
| 2024/0175335 A1* | 5/2024 | Chouzenoux | E21B 34/16 |

* cited by examiner

*Primary Examiner* — Theodore N Yao
(74) *Attorney, Agent, or Firm* — Scott Richardson; Parker Justiss, P.C.

(57) ABSTRACT

Provided is a magnet for use with an SSSV, an SSSV, a well system, and a method. The magnet, in one aspect, includes an electropermanent magnet. The magnet, in accordance with this aspect, further includes a self-powered protection circuit coupled to the electropermanent magnet, the self-powered protection circuit configured to switch the electropermanent magnet to the OFF state when the SSSV loses power.

28 Claims, 48 Drawing Sheets

1700

1760

1750

1730

1720

1740

1710

SUBSURFACE SAFETY VALVE INCLUDING AN ELECTROPERMANENT MAGNET AND TARGET

BACKGROUND

Downhole devices, such as subsurface safety valves (SSSVs) are well known in the oil and gas industry and provide one of many failsafe mechanisms to prevent the uncontrolled release of subsurface production fluids, should a wellbore system experience a loss in containment. In certain instances, SSSVs comprise a portion of a tubing string, the entirety of the SSSVs being set in place during completion of a wellbore. In other instances, the all or a portion of the SSSVs are wireline deployed/retrieved. Although a number of design variations are possible for SSSVs, the vast majority are flapper-type valves that open and close in response to longitudinal movement of a flow tube.

Since SSSVs typically provide a failsafe mechanism, the default positioning of the flapper valve is usually closed in order to minimize the potential for inadvertent release of subsurface production fluids. The flapper valve can be opened through various means of control in order to provide a flow pathway for production to occur. What is needed in the art is an improved SSSV that does not encounter the problems of existing SSSVs.

BRIEF DESCRIPTION

Reference is now made to the following descriptions taken in conjunction with the accompanying drawings, in which.

DETAILED DESCRIPTION

Figure 1:
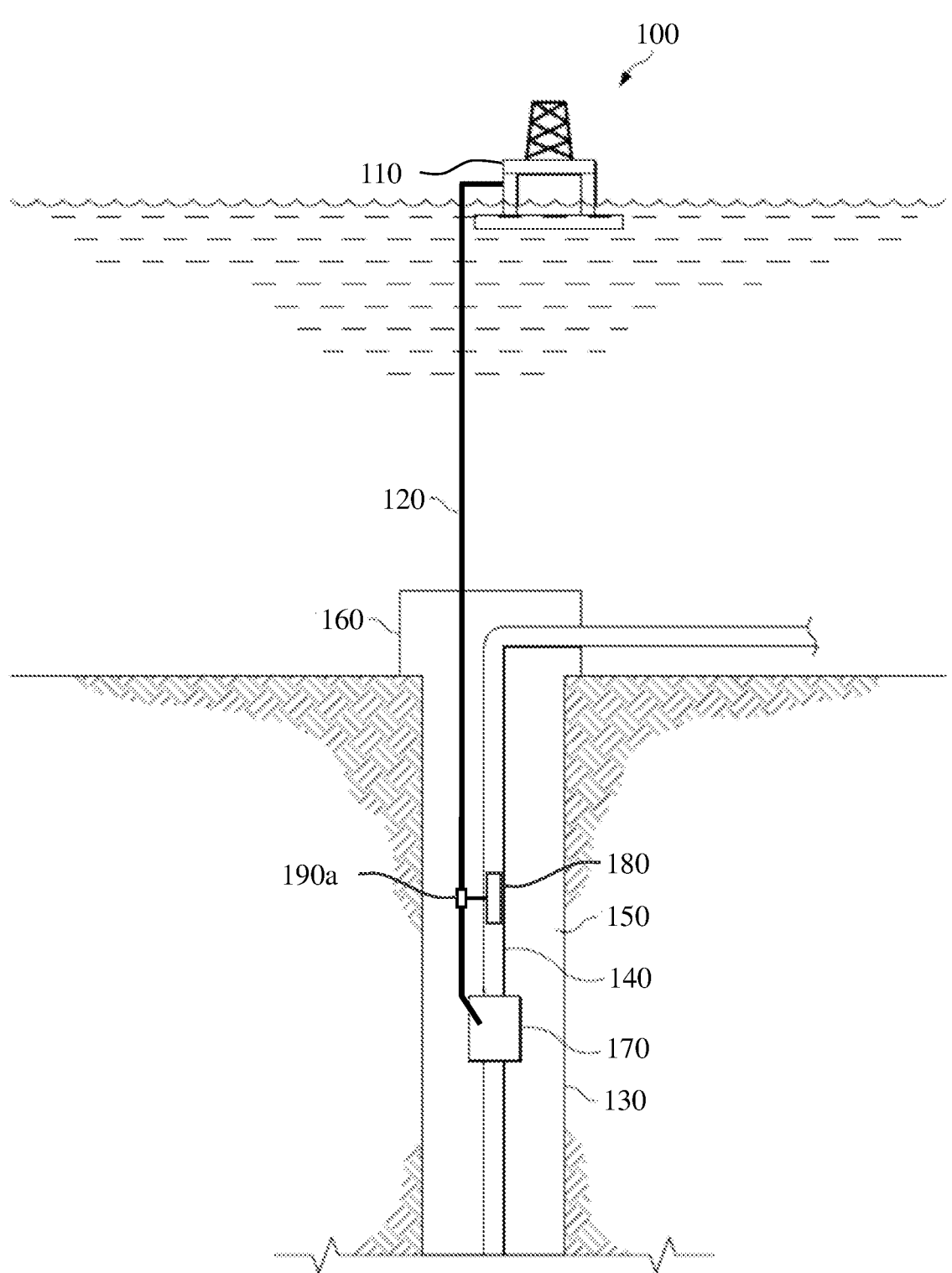
FIG. 1 illustrates a well system designed, manufactured and/or operated according to one or more embodiments of the disclosure.

In the drawings and descriptions that follow, like parts are typically marked throughout the specification and drawings with the same reference numerals, respectively. The drawn figures are not necessarily, but may be, to scale. Certain features of the disclosure may be shown exaggerated in scale or in somewhat schematic form and some details of certain elements may not be shown in the interest of clarity and conciseness. The present disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof. Additionally, the term, "or," as used herein, refers to a non-exclusive or, unless otherwise indicated.

Unless otherwise specified, use of the terms "connect," "engage," "couple," "attach," or any other like term describing an interaction between elements is not meant to limit the interaction to direct interaction between the elements, and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," "downstream," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as ocean or fresh water.

The present disclosure has acknowledged that offshore wells are being drilled at ever increasing water depths and in environmentally sensitive waters, and thus safety valves (e.g., including subsurface safety valves (SSSVs)) are necessary. The present disclosure has further acknowledged that there is a push for an all-electric completion system, for example one that includes the SSSV. To minimize the use of electronics downhole, it would be desirable to lock the SSSV in an open position using an electromagnet, so that when the power is lost the SSSV valve of the SSSV would immediately close (e.g., through the use of a return spring or other feature).

The present disclosure has recognized that one main challenge with electromagnets (or magnets in general) is that the force is inversely proportional to the square of the distance between the magnet and its target. Therefore, any debris introduced between the magnet and its target can significantly affect the holding force capability. The present disclosure has additionally recognized that the electromagnetic force is proportional to the square of the surface area of the magnet and the target faces. The present disclosure has further recognized that there is limited radial space in typical downhole tools.

Given the foregoing, the present disclosure had developed an SSSV that employs an electromagnet, a target, and a radially compressible member, to fix the axial location of the flow tube when necessary. In at least one embodiment, the electromagnet is fixedly coupled to a housing of the SSSV. The target, in this one embodiment, is positioned proximate the electromagnet, and is configured to remain in an axially distal position when the electromagnet is not energized and be axially drawn toward and held in an axially proximal position by the electromagnet when the electromagnet is energized. The radially compressible member, in this embodiment, is located radially between a flow tube of the SSSV and the housing, and is engageable with the target and configured to move between: 1) a radially extended state when the electromagnet is not energized and the target is in the axially distal position to allow the flow tube to move between the closed state and the open state; and 2) a radially compressed state when the electromagnet is energized and the target is in the axially proximal position to hold the flow tube in the flow state. The combination of the electromagnet, target, and radially compressible member alleviates many of the issues of existing SSSVs.

In at least one embodiment, the radially compressible member is a collet, and the target includes an angled target surface and the collet includes a reciprocal angled collet surface, the angled target surface configured to slide upon the reciprocal angled collet surface as the electromagnet to move the collet to the radially compressed state. These angled surfaces, in at least one embodiment, provide the mechanism by which axial translation of the target translates into the radial compression of the collet, and thus the resulting holding of the flow tube. In at least one embodiment, the radially compressible member has a radially compressible member friction surface along a radially interior surface thereof and the flow tube has a reciprocal flow tube friction surface along a radially exterior surface thereof, the radially compressible member friction surface configured to engage with the reciprocal flow tube friction surface when the electromagnet is energized, the target is in the axially proximal position and the radially compressible member is in the radially compressed state to hold the flow tube in the flow state. In at least one other embodiment, the radially compressible member has a radially compressible member engaging profile along a radially interior surface thereof and the flow tube has a reciprocal flow tube engaging profile along a radially exterior surface thereof, the radially compressible member engaging profile configured to engage with the reciprocal flow tube engaging profile when the electromagnet is energized, the target is in the axially proximal position and the radially compressible member is in the radially compressed state to hold the flow tube in the flow state. For example, in one or mor embodiments, the radially compressible member engaging profile is one or more radially compressible member teeth and the flow tube engaging profile is one or more flow tube teeth shaped profiles.

In certain embodiments, the SSSV includes a safety mechanism, the safety mechanism configured to prevent the radially compressible member from restricting movement of the flow tube unless the flow tube is in the flow state. For example, in at least one embodiment, the safety mechanism is an electromagnet safety mechanism, the electromagnet safety mechanism configured to prevent the electromagnet from being energized unless the flow tube is in the flow state. Other safety mechanisms, however, are within the scope of the disclosure.

In yet other embodiments, the SSSV includes a return mechanism positioned between the electromagnet and the target, the return mechanism configured to return the target to the axially distal position when the electromagnet is not energized. In at least one embodiment, the return mechanism is a spring that either pushes or pulls the target to the axially distal position. While the spring has been described as one return mechanism, those skilled in the art understand the myriad of different return mechanisms that could be used and remain within the scope of the disclosure. In at least one embodiment, no return mechanism is needed, but the radially outward spring force of the radially compressible member (e.g., when the electromagnet is not energized) returns the target to the axially distal position. For example, the radially compressible member could be configured such that it is always being compressed (e.g., providing the radially outward spring force), and thus the radially extended state is a first compressed state and the radially compressed state is a second more compressed state.

Given the foregoing, the present disclosure has further developed an SSSV that employs an electropermanent magnet. An electropermanent magnet is a type of permanent magnet in which the external magnetic field can be switched on or off by a pulse of electric current in a wire winding around part of the magnet. Typically, the electropermanent magnet consists of two sections, one of "hard" (high coercivity) magnetic material and one of "soft" (low coercivity) material. The direction of magnetization in the latter piece (e.g., "soft" or low coercivity piece) can be switched by a pulse of current in a wire winding about the former (e.g., "hard" or high coercivity piece). When the magnetically soft and hard materials have opposing magnetizations, the magnet produces no net external field across its poles, and thus is switched OFF, while when their direction of magnetization is aligned the magnet produces an external magnetic field, and thus is switched ON. Continuous power is not required to keep the electropermanent magnet in either of the ON state or the OFF state, but just required to switch between the ON state and the OFF state.

The present disclosure has recognized that by using the electropermanent magnet, the SSSV is capable of harnessing the most positive aspects of traditional permanent magnets and traditional electromagnets. For example, permanent magnets have greater force per unit volume than their electromagnet counterpart, but their use is often limited in SSSV applications as they do not have the necessary ON/OFF capability needed for SSSVs. In contrast, while electromagnets have the necessary ON/OFF capability needed for SSSVs, their force per unit volume can be inadequate for certain SSSV applications. Electropermanent magnets, however, have the necessary ON/OFF capability needed for SSSVs, as well as the greater force per unit volume needed. Additionally, electropermanent magnets do not need to be constantly powered on, which will save operating costs. Therefore, the electropermanent magnets may be employed in applications where an amount of electrical power is limited, such as subsea applications. Moreover, the electropermanent magnets are capable of providing a much higher force compared to the power consumed, which may make them more reliable and more debris tolerant.

Notwithstanding the foregoing, the present disclosure recognized that electropermanent magnets must be configured to still switch from the ON state to the OFF state (e.g., autonomously switch) even when power is lost to the SSSV. With this recognition in mind, the present disclosure developed an improved magnet for use with an SSSV. The improved magnet, in one or more embodiments, includes an electropermanent magnet. The improved magnet, in one or more embodiments, further includes a self-powered protection circuit coupled to the electropermanent magnet. In this embodiment, the self-powered protection circuit is configured to switch the electropermanent magnet to the OFF state when the SSSV loses power. In at least one embodiment, the self-powered protection circuit includes a downhole power source configured to provide a pulse of current to switch the electropermanent magnet to the OFF state when the SSSV loses power. For example, the downhole power source could be a capacitor, a battery, or another similar power source.

In at least one embodiment, the improved magnet includes a switching circuit positioned between the downhole power source and the electropermanent magnet, the switching circuit configured to switch the electropermanent magnet to the OFF state when the SSSV loses power. For example, in at least one embodiment, the switching circuit is a relay circuit (e.g., a double pole double throw relay switch), the relay circuit configured to keep the electroper-manent magnet in the ON state when the SSSV has power, but configured to allow the electropermanent magnet to move to the OFF state when the SSSV loses power. In at least one embodiment, the improved magnet places a diode between the downhole power source and the relay circuit, the diode configure prevent the downhole power source from powering the relay circuit when the SSSV loses power.

Advantageously, this improved magnet may be used with any SSSV configuration and remain within the scope of the present disclosure. For example, the improved magnet could be used with any SSSV that includes a housing, a valve, a flow tube, and a target and remain within the scope of the present disclosure.

FIG. 1 illustrates a well system 100 designed, manufac-tured and/or operated according to one or more embodi-ments of the disclosure. The well system 100, in at least one embodiment, includes an offshore platform 110 connected to a first downhole device 170 (e.g., first SSSV, such as a TRSV) and a second downhole device 180 (e.g., second SSSV, such as a WLRSV) via a control line 120 (e.g., single electrical control line, single primary control line, TEC, etc.). An annulus 150 may be defined between walls of a wellbore 130 and a conduit 140. A wellhead 160 may provide a means to hand off and seal conduit 140 against the wellbore 130 and provide a profile to latch a subsea blowout preventer to. Conduit 140 may be coupled to the wellhead 160. Conduit 140 may be any conduit such as a casing, liner, production tubing, or other oilfield tubulars disposed in a wellbore.

The first downhole device 170, or at least a portion thereof, may be interconnected with the conduit 140 (e.g., interconnected in line with the conduit 140) and positioned in the wellbore 130. The second downhole device 180, or at least a portion thereof, may be interconnected with the conduit 140 (e.g., positioned within an ID or OD of the conduit 140) and positioned in the wellbore 130. In the illustrated embodiment, the second downhole device 180 is illustrated uphole of the first downhole device 170 (e.g., a portion of it being run-in-hole with the first downhole device 170 and another portion of it being run-in-hole after the first downhole device 170 has failed), but other embodiments may possibly exist wherein the second downhole device 180 is located downhole of the first downhole device 170.

The control line 120 may extend into the wellbore 130 and may be connected to the first downhole device 170 and the second downhole device 180. The control line 120 may provide power to the first downhole device 170 and the second downhole device 180. As will be described in further detail below, power may be provided to first downhole device 170 or the second downhole device 180 to actuate or de-actuate the first downhole device 170 or the second downhole device 180. Actuation may comprise holding the first downhole device 170 or the second downhole device 180 in an open position, and thus providing a flow path for subsurface production fluids to enter conduit 140, and de-actuation may comprise allowing the first downhole device 170 or the second downhole device 180 to move toward a closed position, and thus closing a flow path for subsurface production fluids to enter conduit 140. While the embodi-ment of FIG. 1 illustrates only the first downhole device 170 and the second downhole device 180, other embodiments exist wherein more than two downhole devices according to the disclosure are used.

In accordance with one embodiment of the disclosure, the well system 100 may further include a switch system 190 positioned between the control line 120 and each of the first downhole device 170 and the second downhole device 180. The switch system 190, in one embodiment, is configured to switch the incoming power from the control line 120 between the first downhole device 170 and the second downhole device 180, depending on which of the first downhole device 170 or the second downhole device 180 that the operator intends to operate. In at least one embodi-ment, the first downhole device 170 includes a first electrical device (e.g., electromagnetic coils, electric motor or pump, piezoelectric actuator, solenoid valve, etc.) and the second downhole device 180 includes a second electrical device (e.g., electromagnetic coils, electric motor or pump, piezo-electric actuator, solenoid valve, etc.), and the switch system 190 is configured to switch the incoming power from the control line 120 between the first electrical device of the first downhole device 170 and the second electrical device of the second downhole device 180.

While the embodiment of FIG. 1 employs a single control line 120 and the switch system 190, other embodiments of the disclosure could use two or more different control lines with or without the switch system 190. Although the well system 100 is depicted in FIG. 1 as an offshore well system, one of ordinary skill should be able to adopt the teachings herein to any type of well, including onshore or offshore. In the embodiment of FIG. 1, the first downhole device 170 is a TRSV, and the second downhole device 180 is a WLRSV.

Figure 2A:
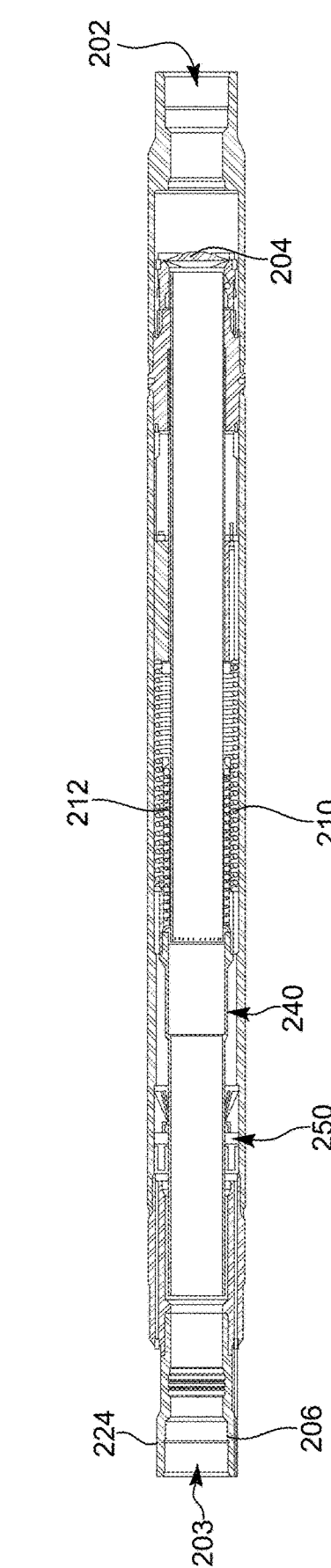
FIGS. 2A through 6C illustrate one embodiment of an SSSV designed, manufactured and/or operated according to one or more embodiments of the disclosure.
Figure 4A:
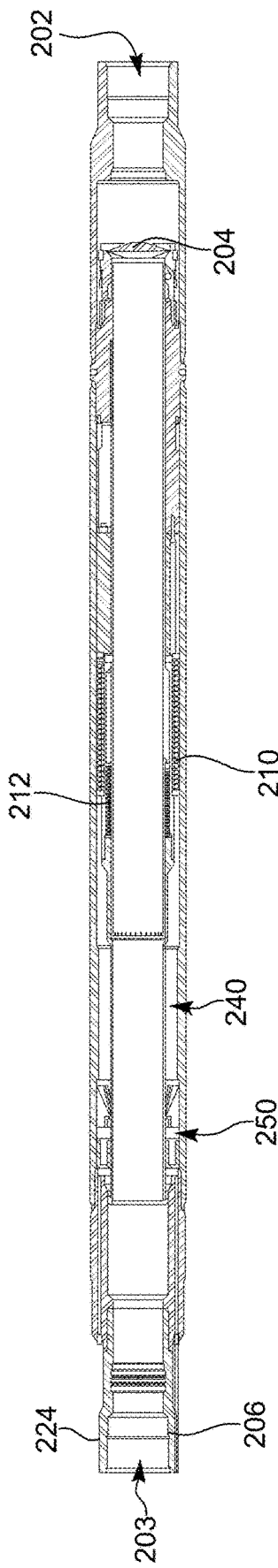
Figure 4B:
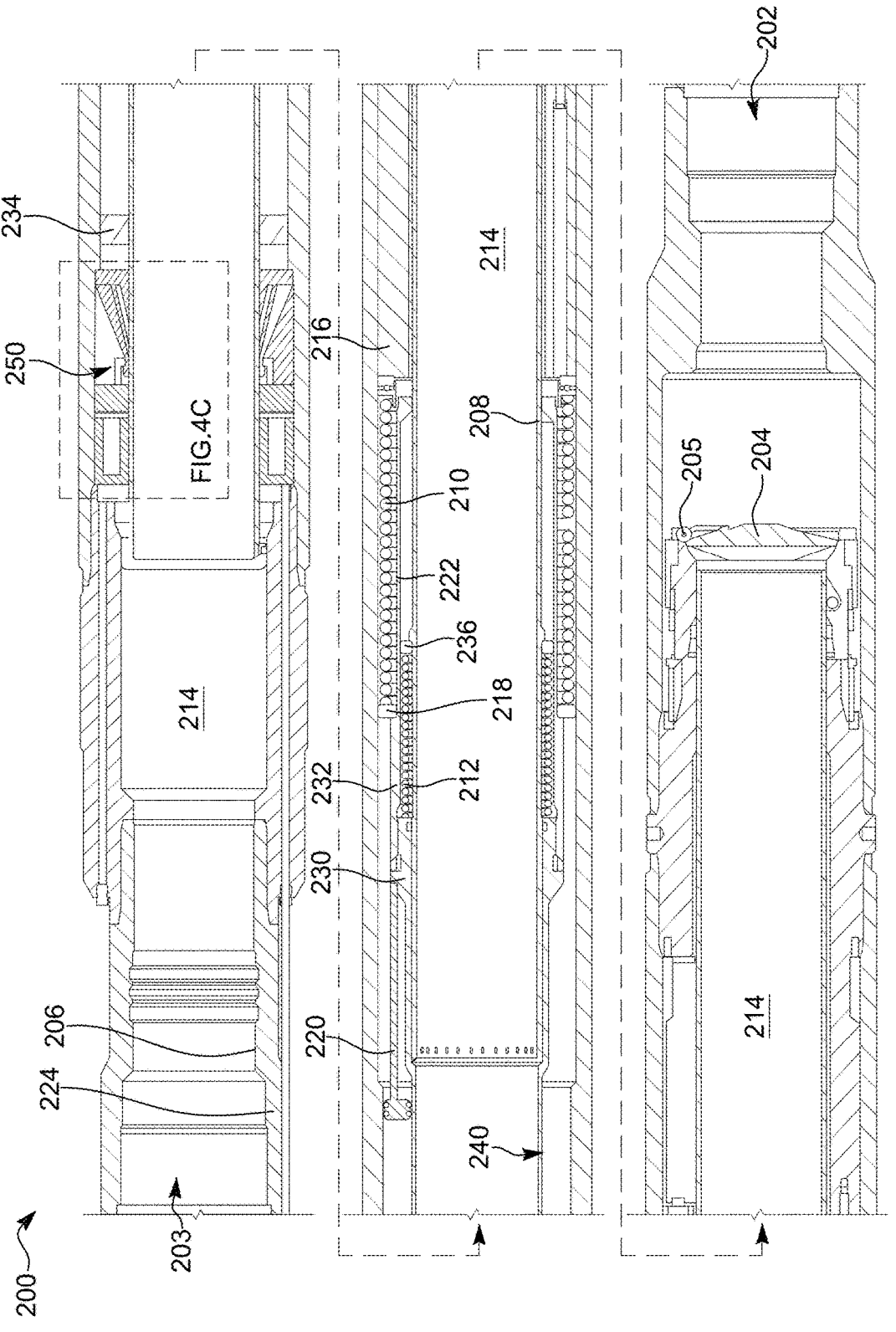
Figure 4C:
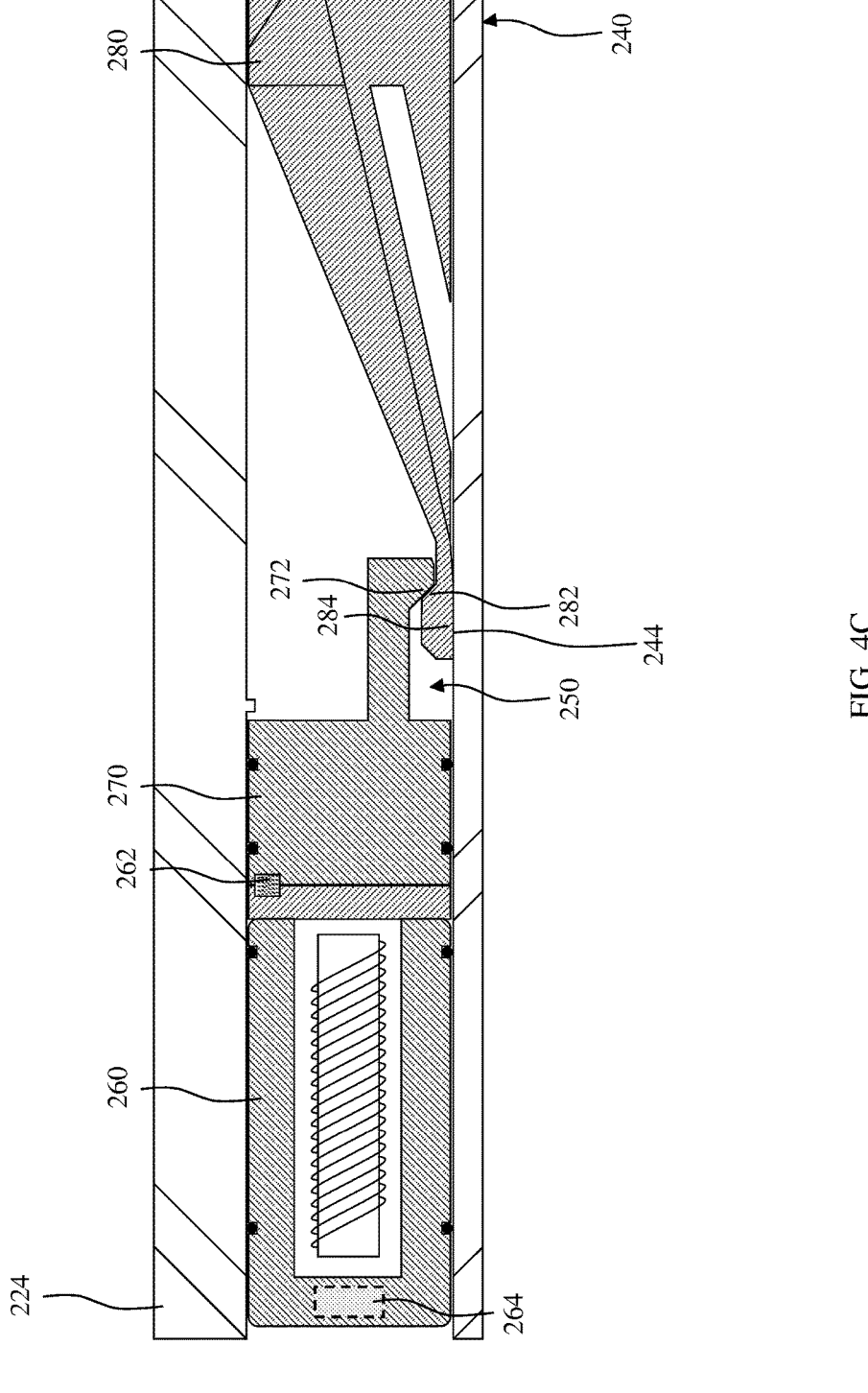
Figure 5A:
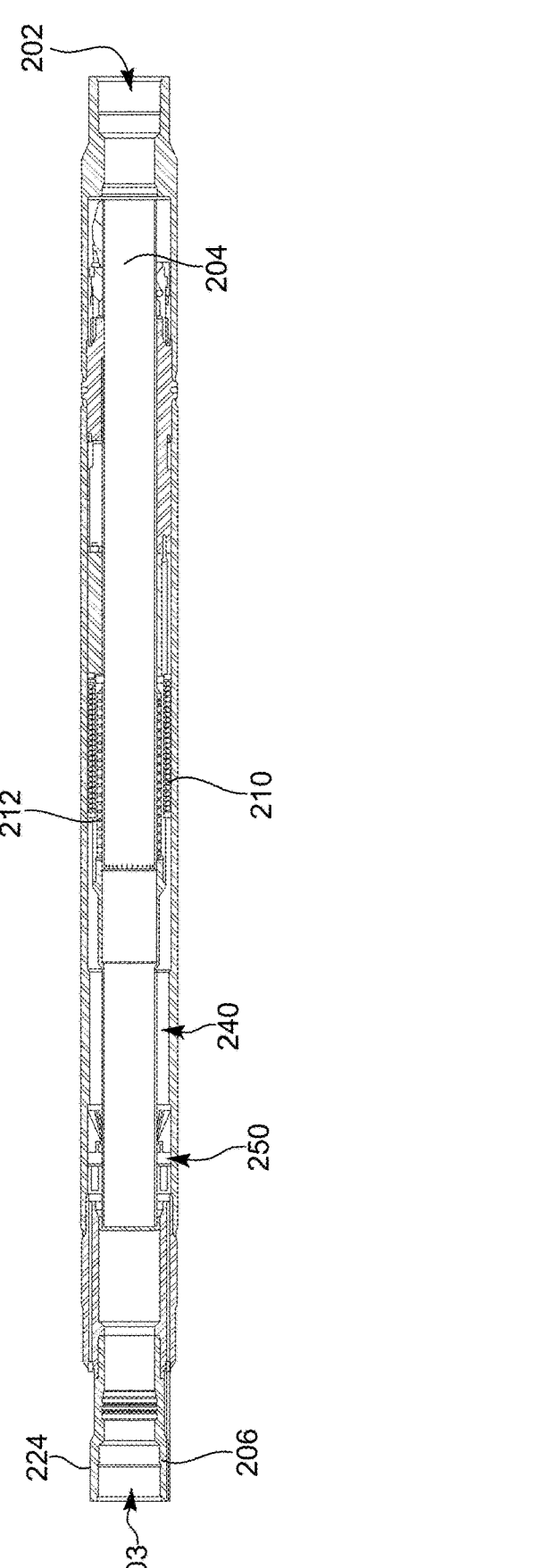
Figure 5B:
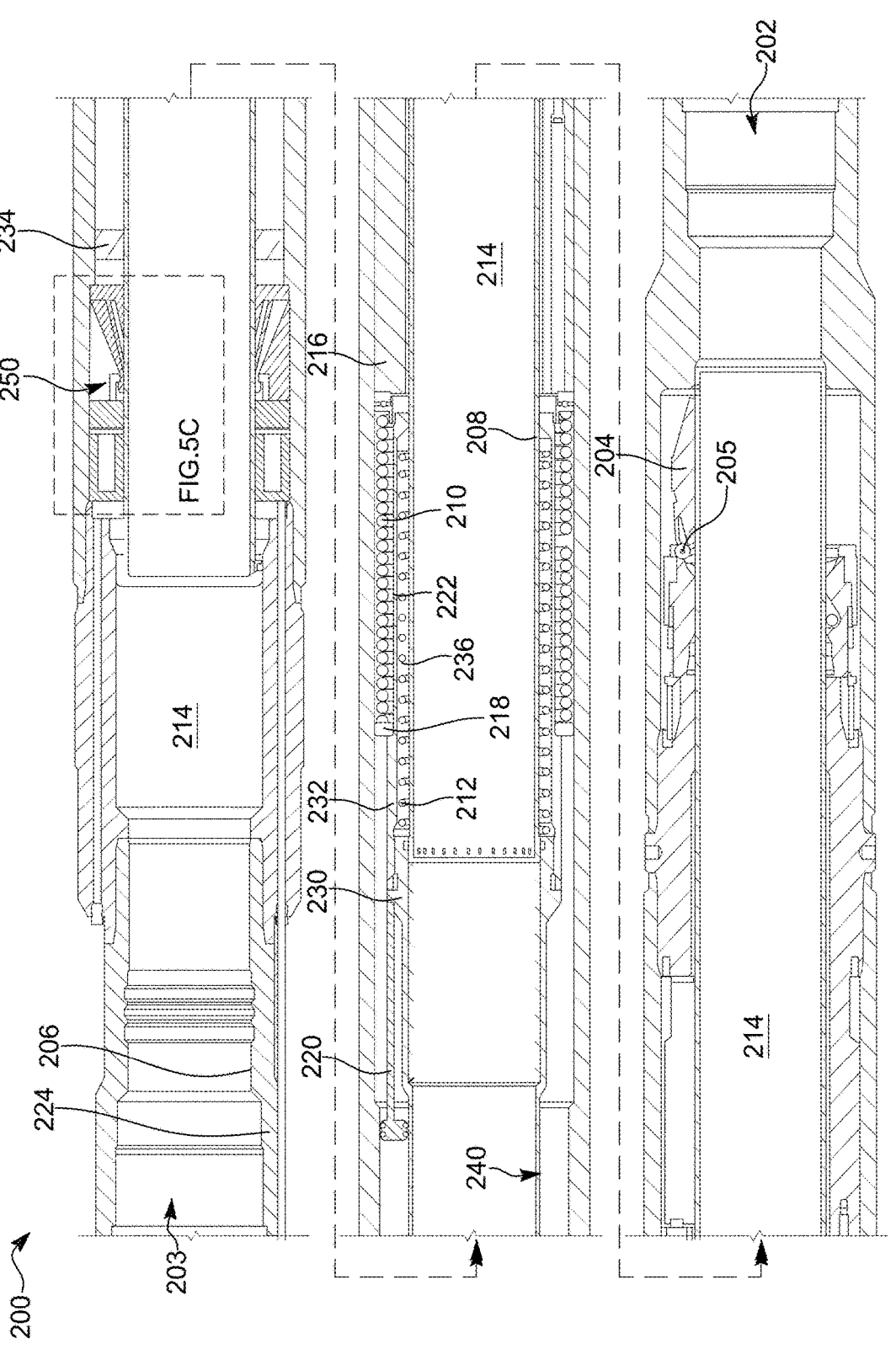
Figure 5C:
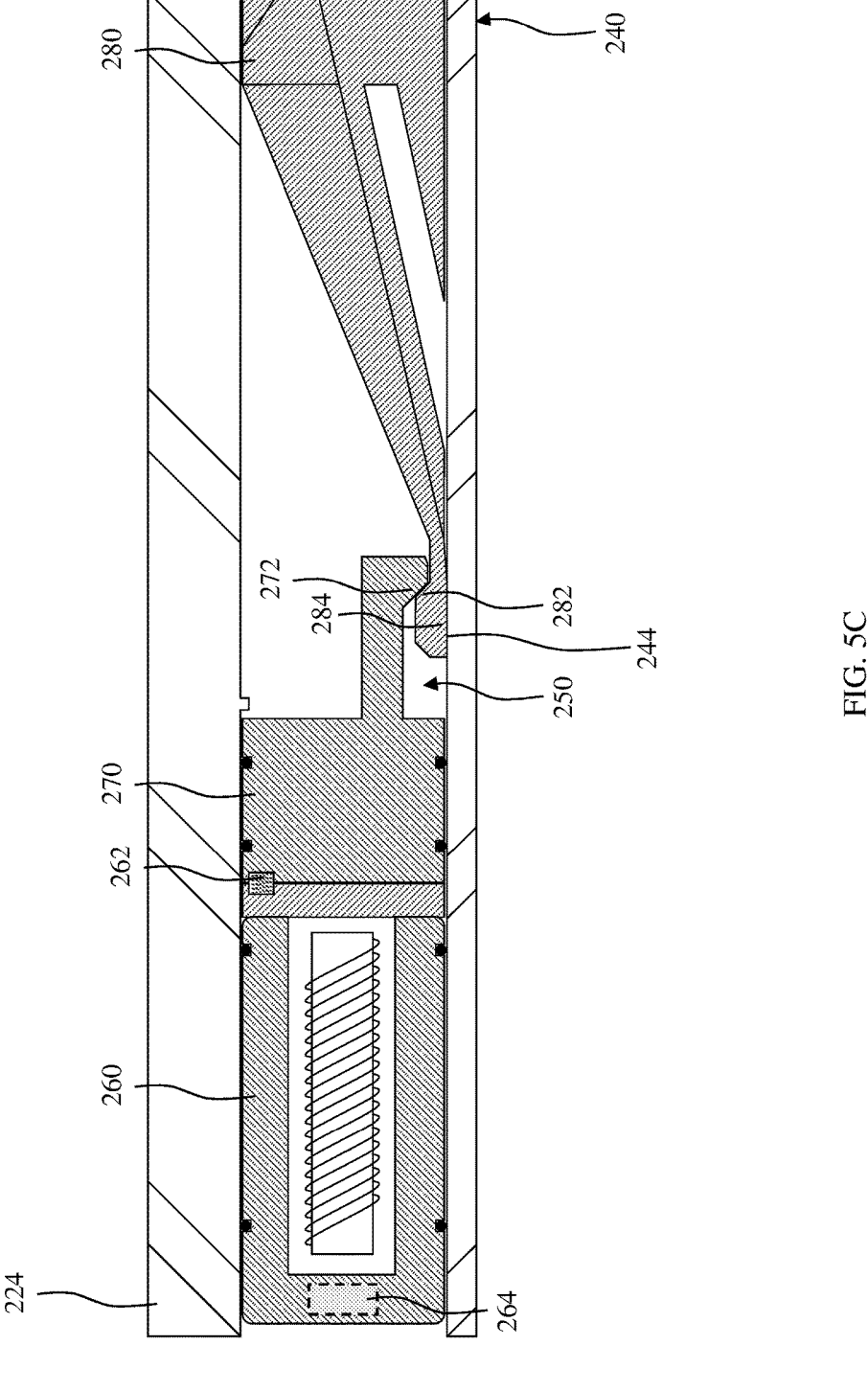
Figure 6A:
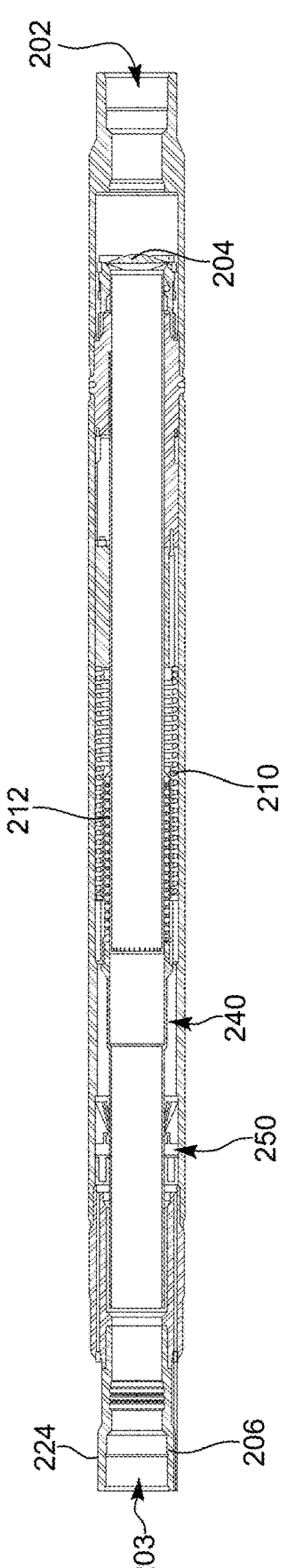
Figure 6B:
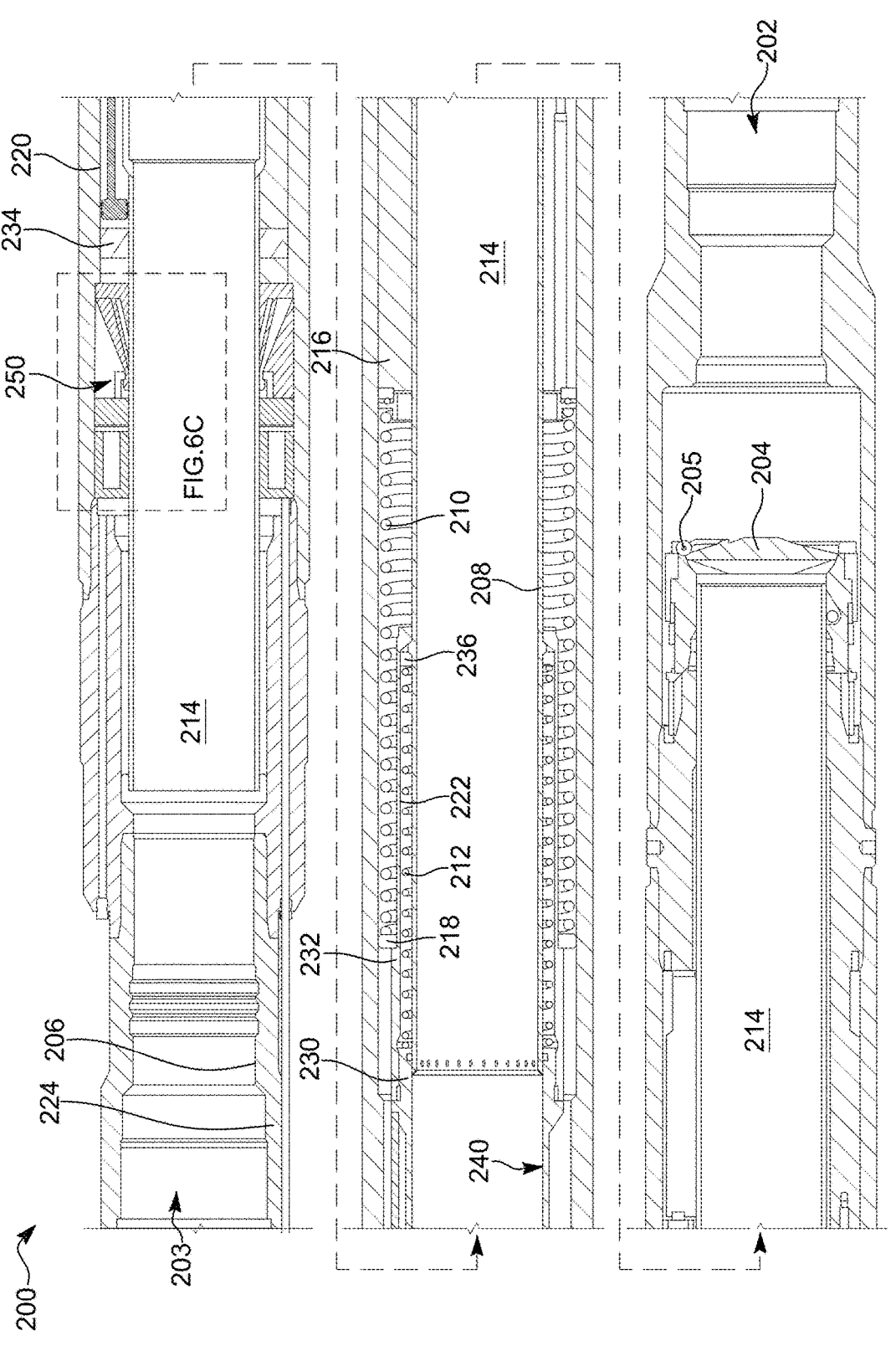
Figure 6C:
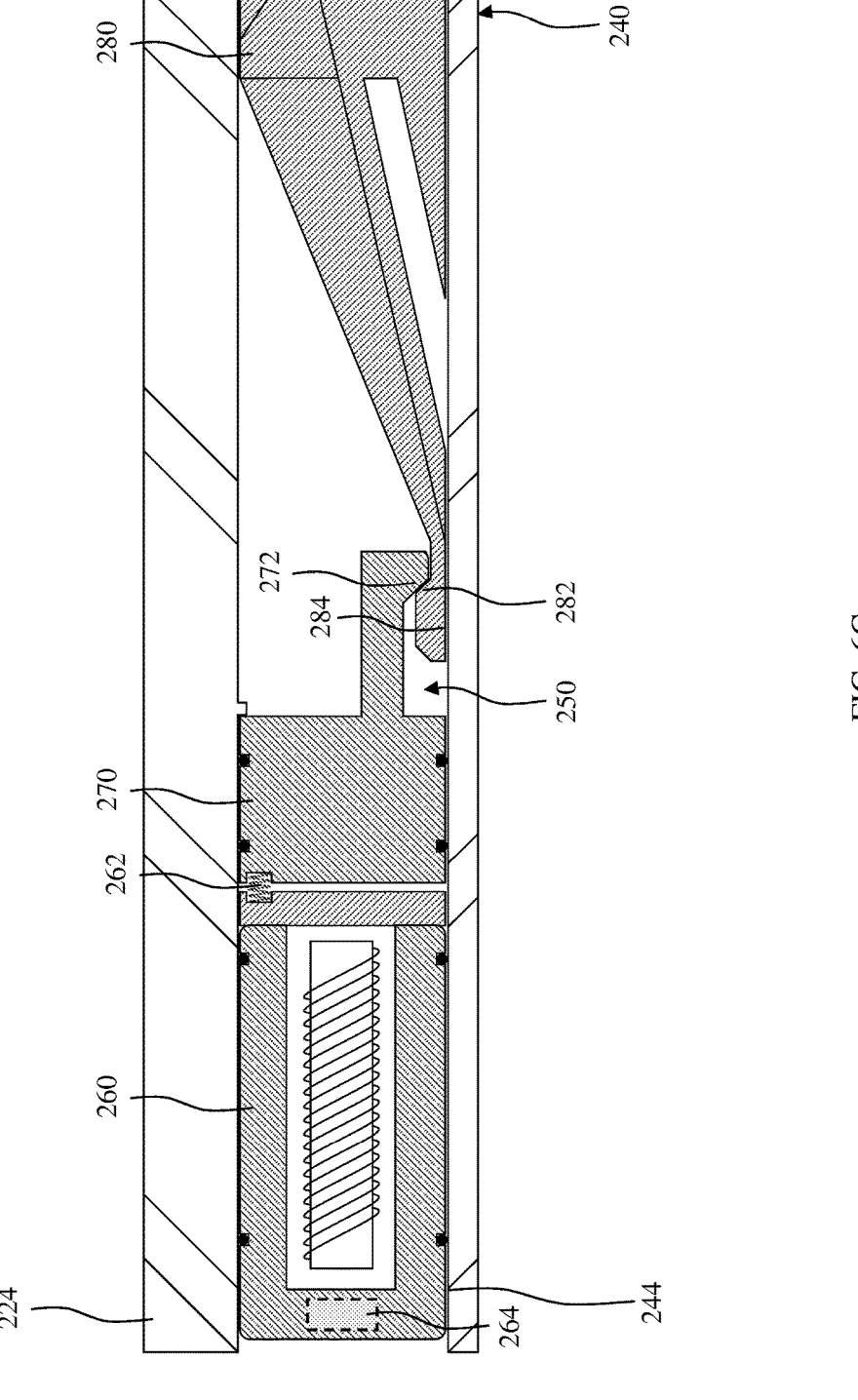
Figure 7A:
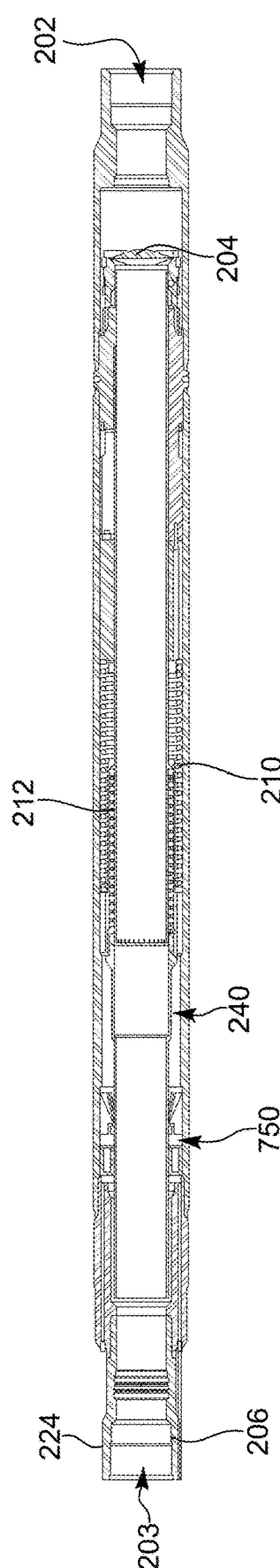
FIGS. 7A through 11C illustrate one embodiment of an SSSV designed, manufactured and/or operated according to one or more alternative embodiments of the disclosure.
Figure 7B:
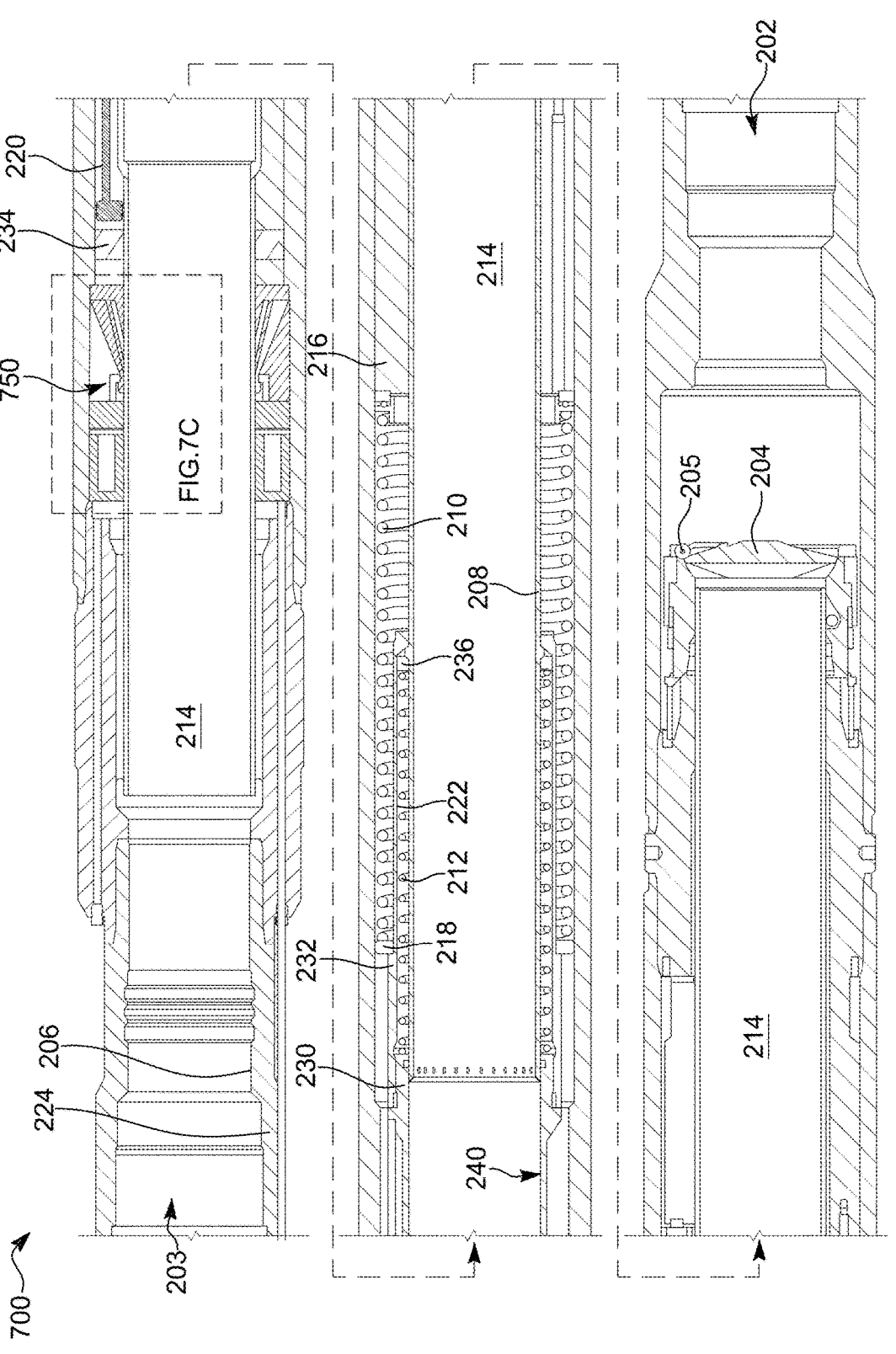
Figure 7C:
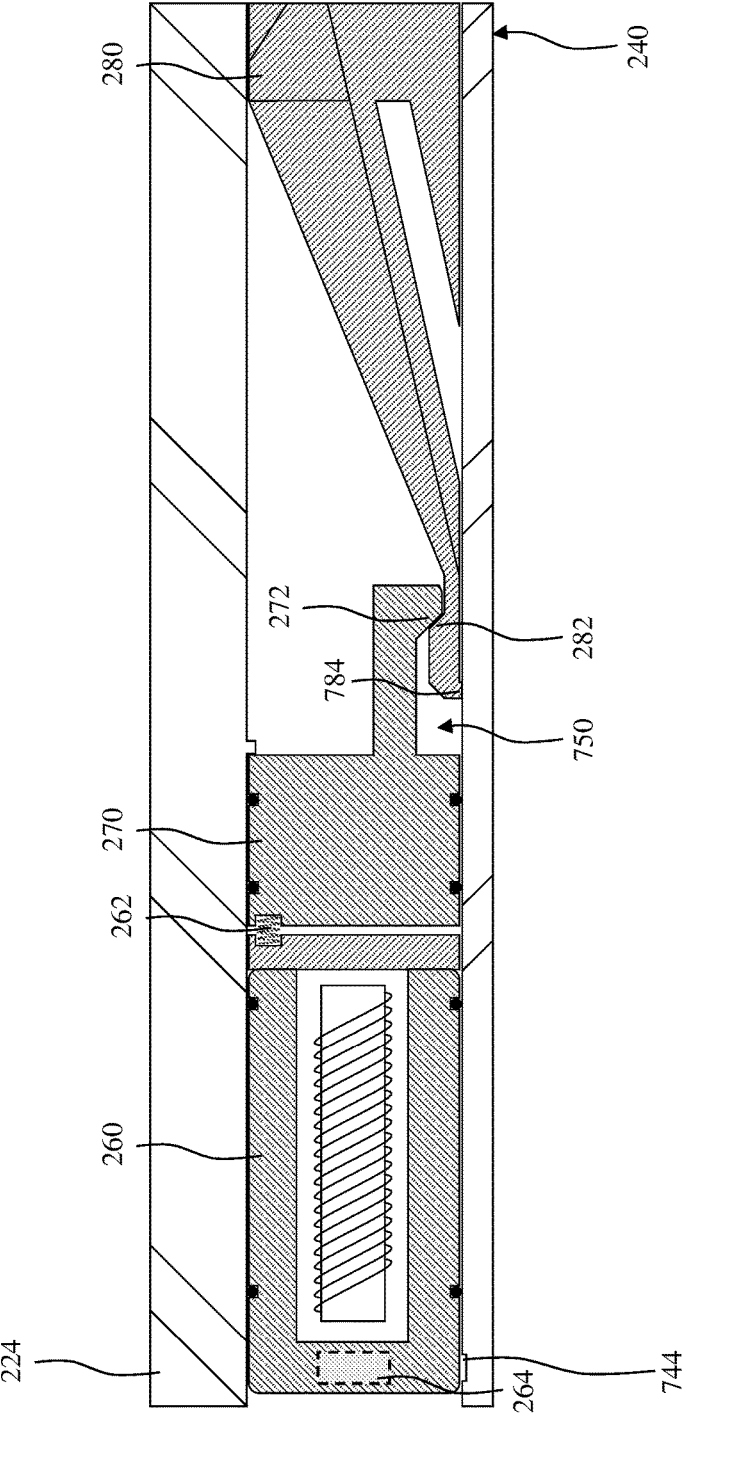
Figure 8A:
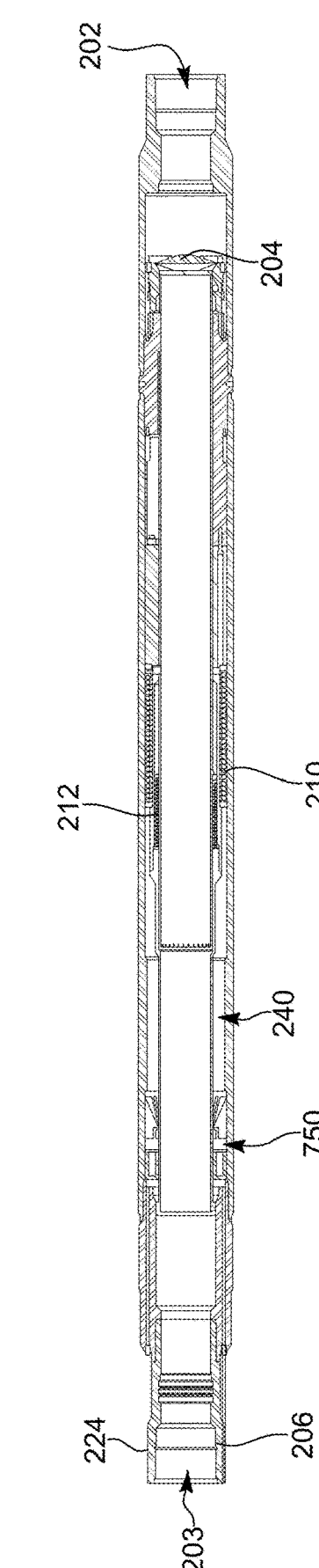
Figure 8B:
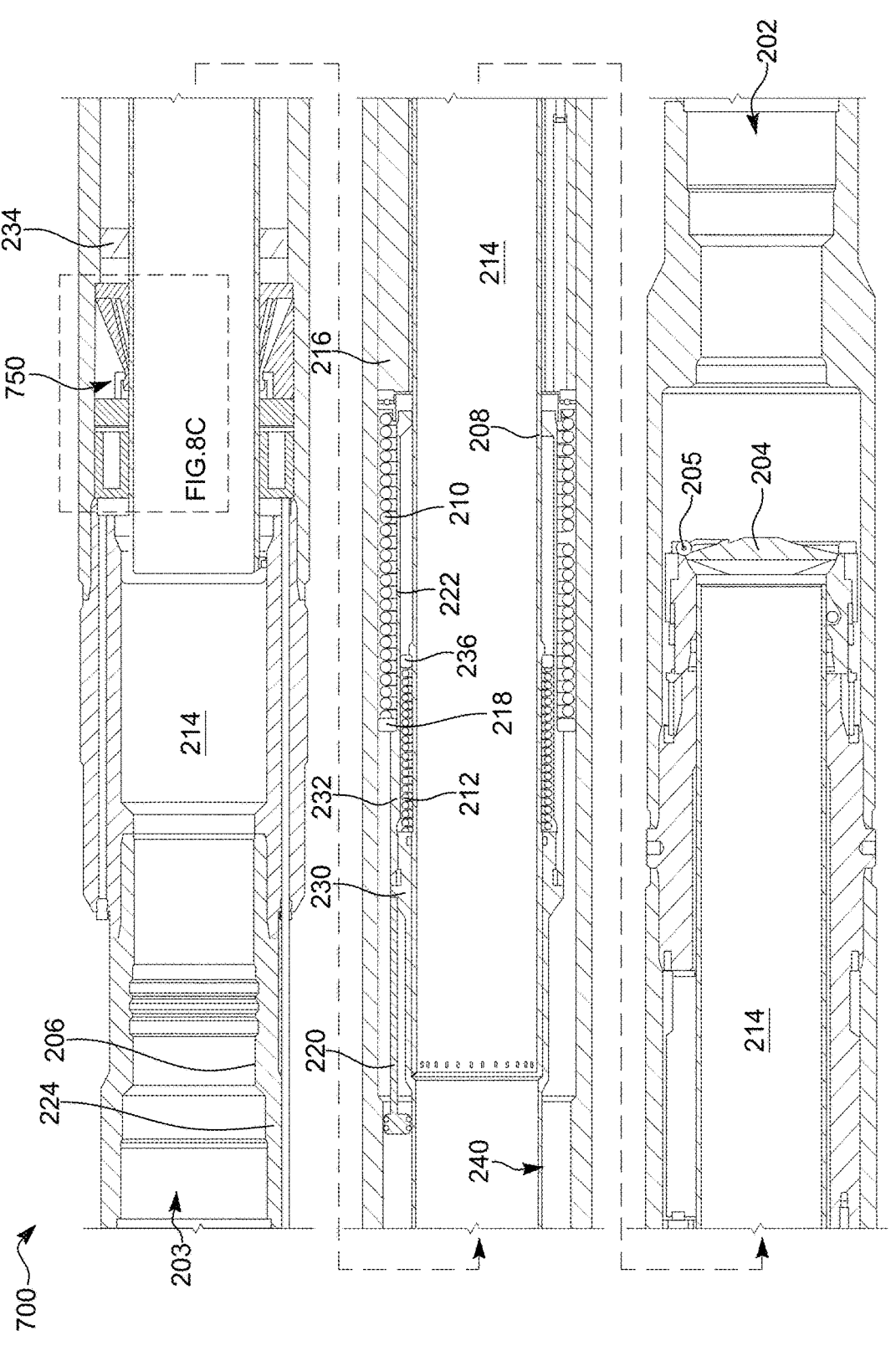
Figure 8C:
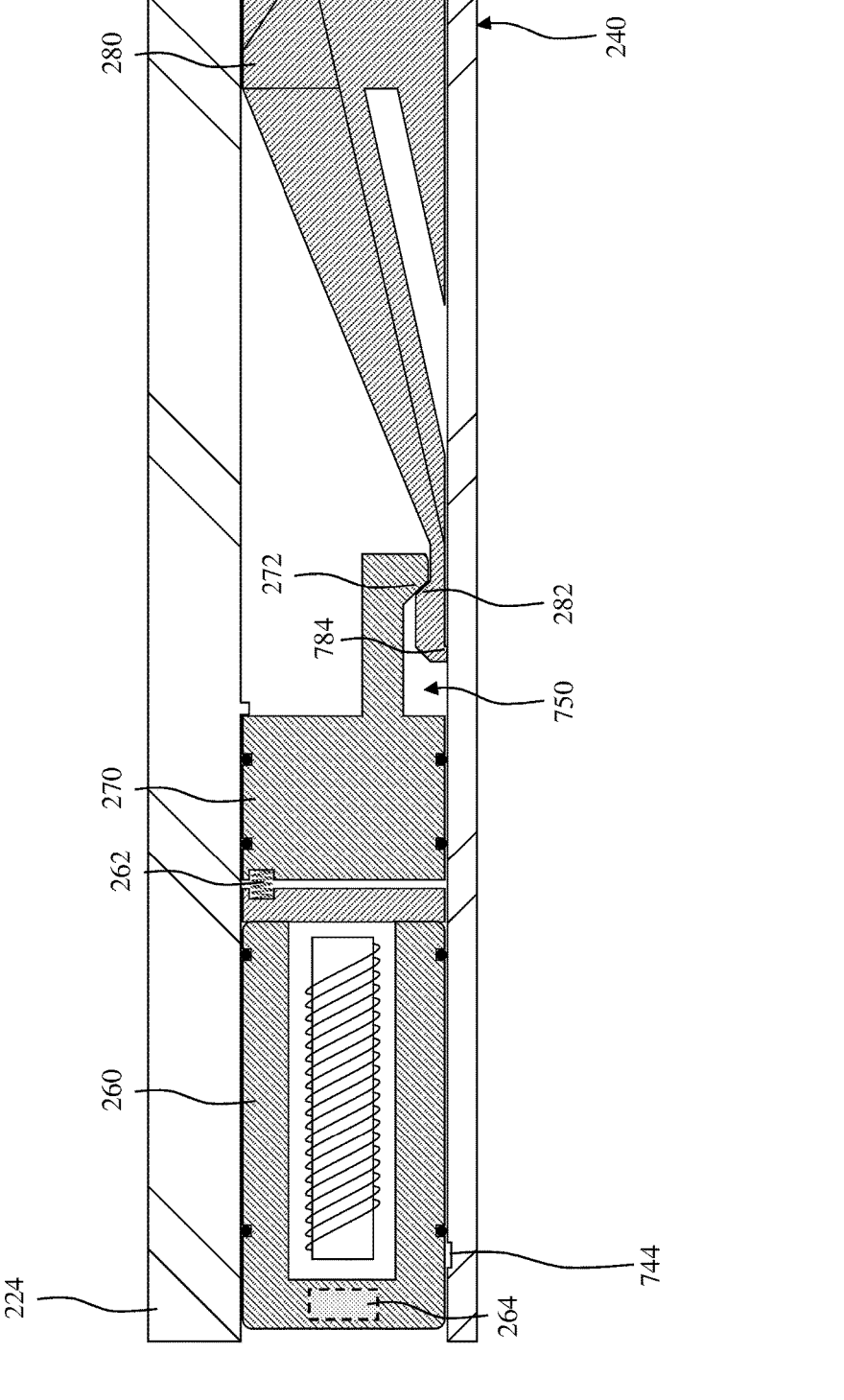
Figure 9A:
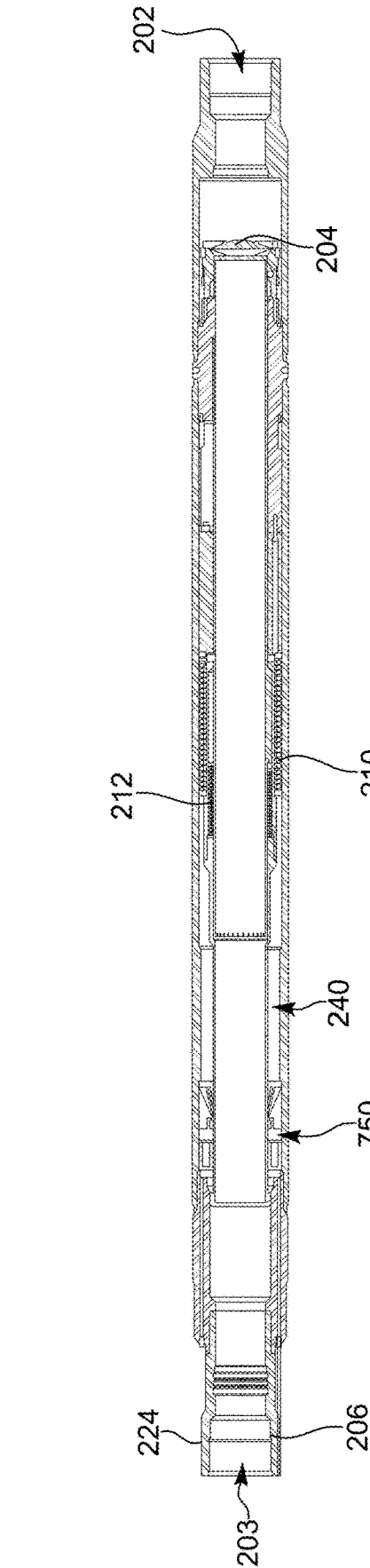
Figure 9B:
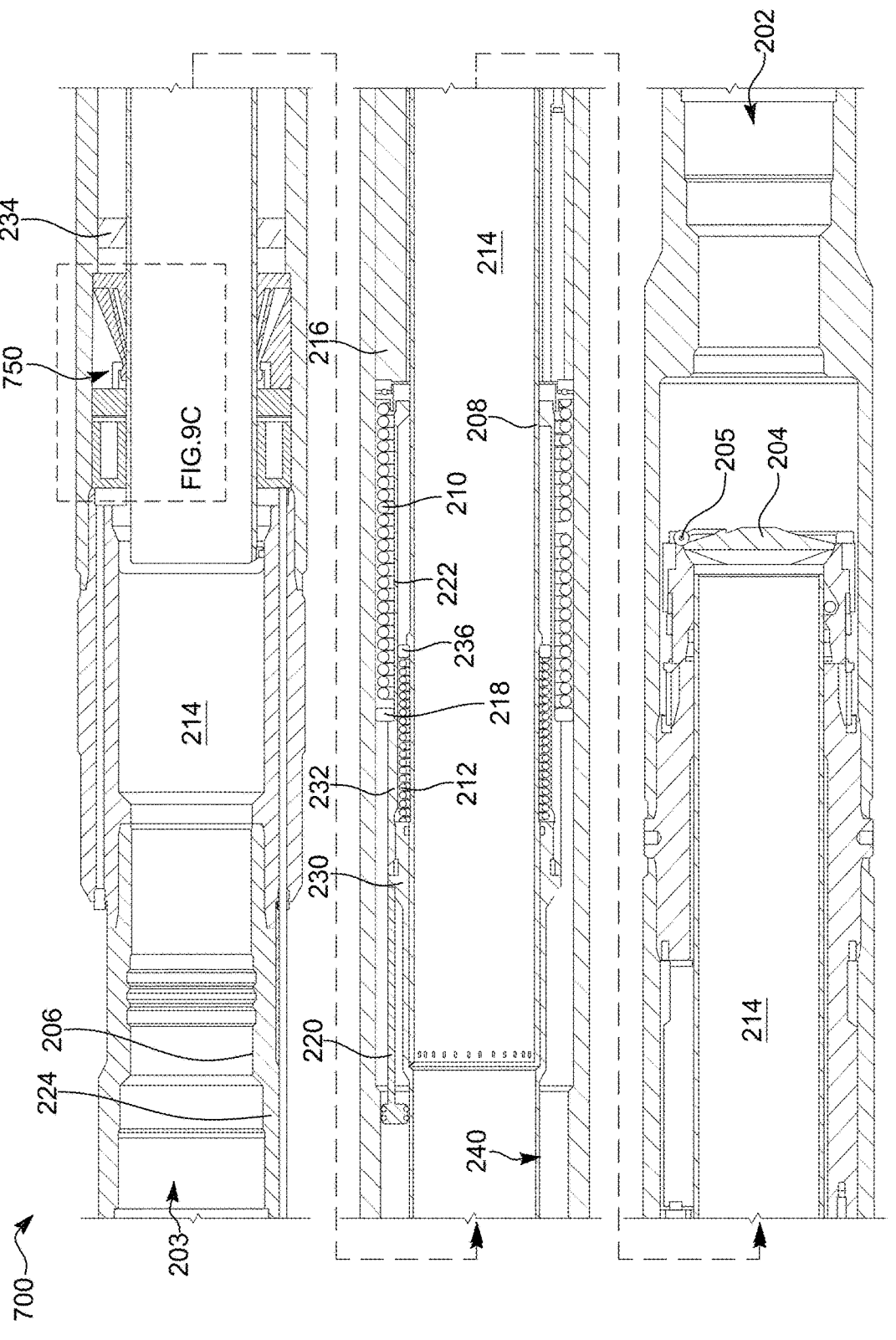
Figure 9C:
Figure 10A:
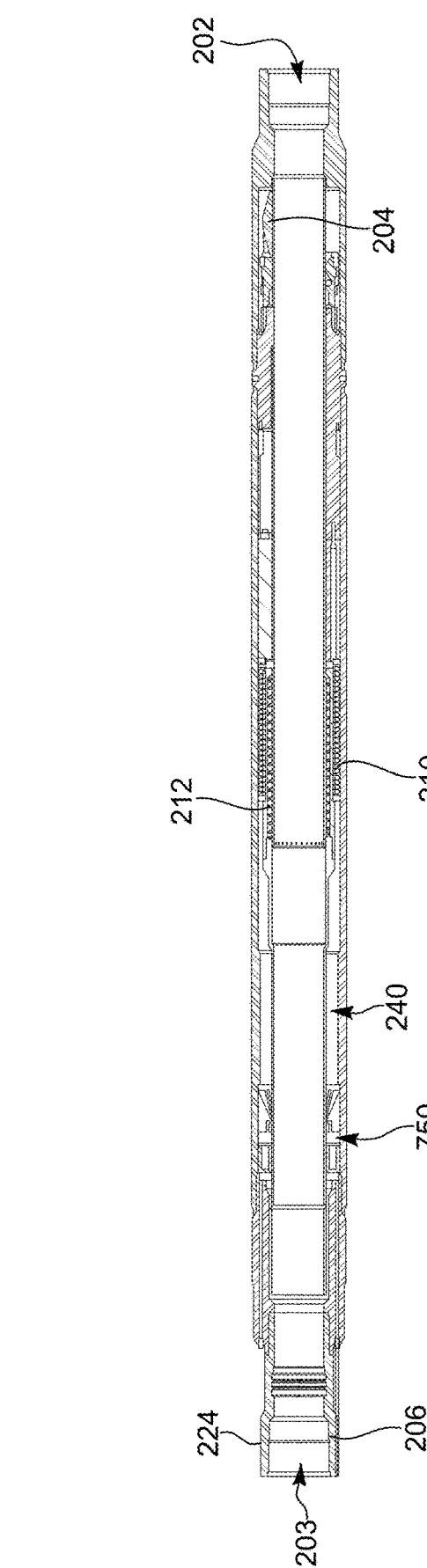
Figure 10B:
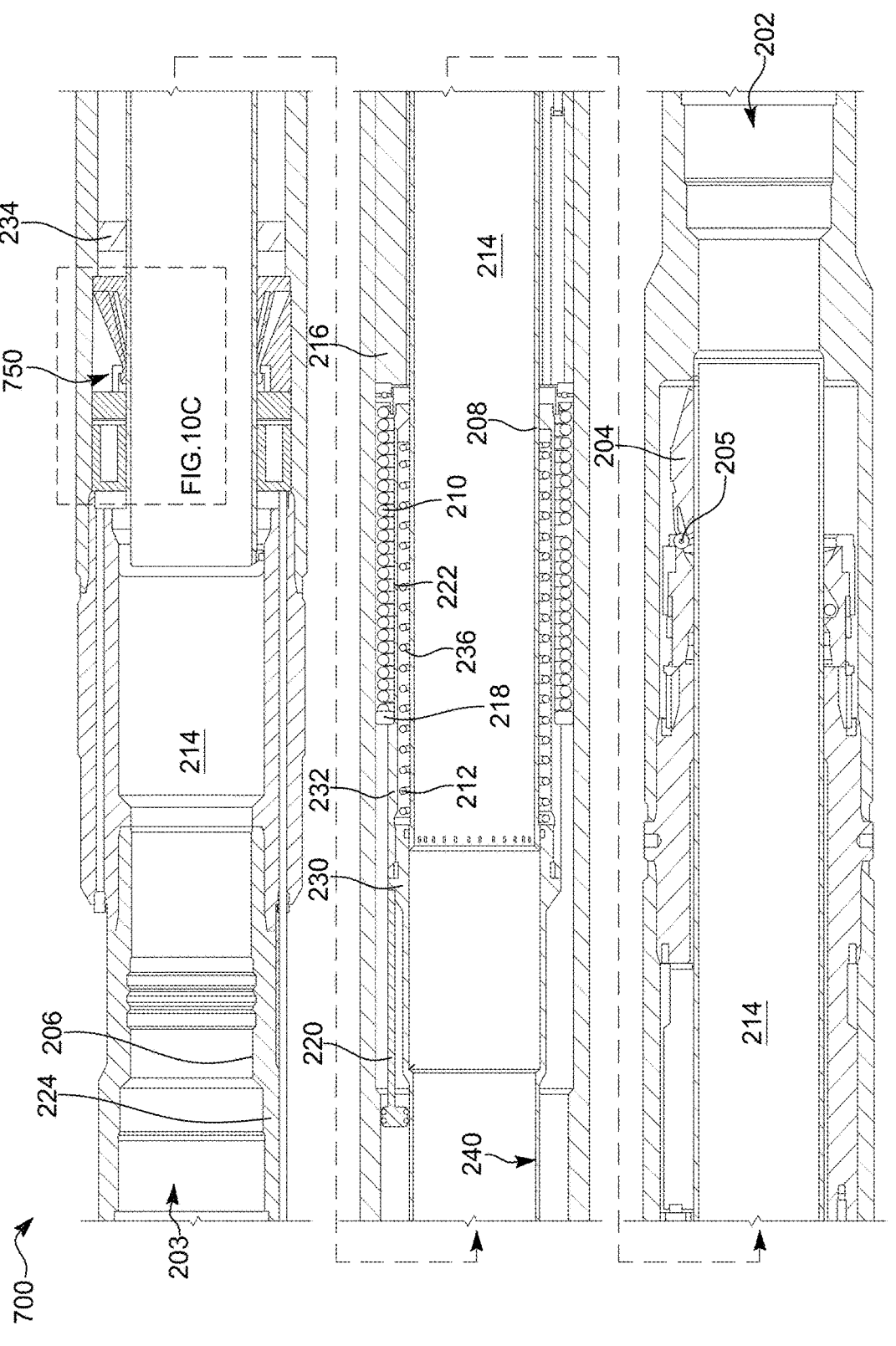
Figure 10C:
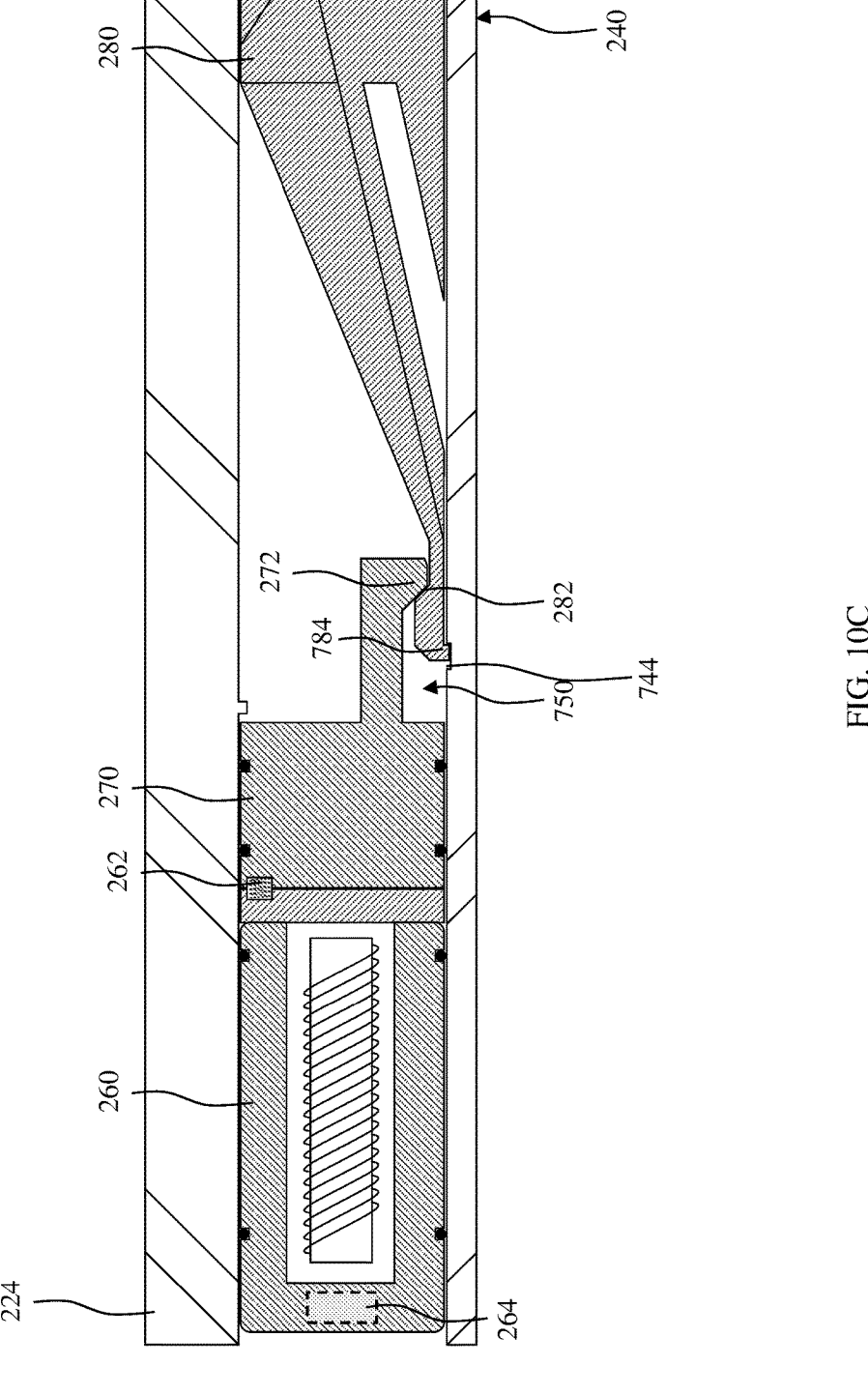
Figure 11A:
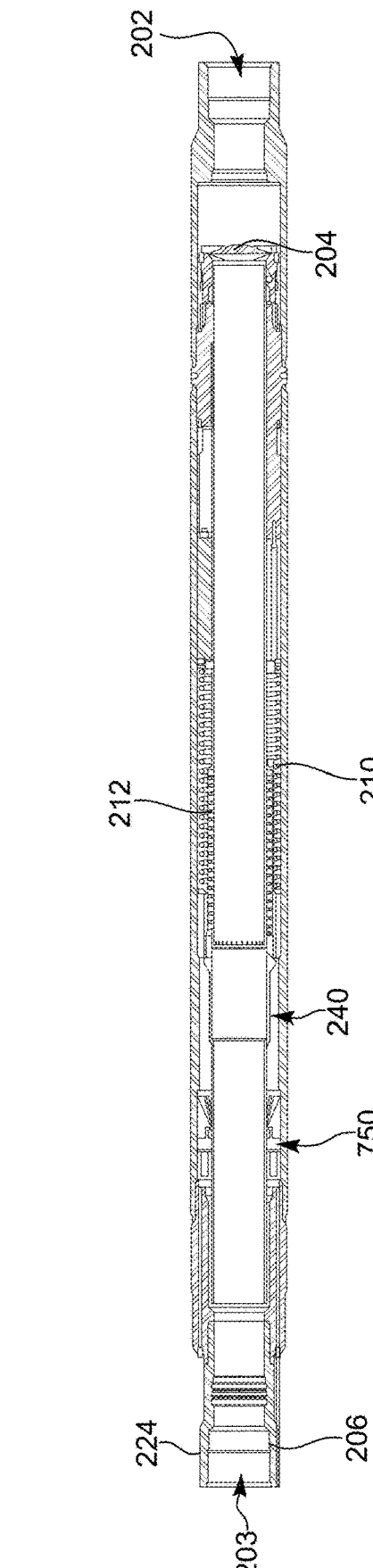
Figure 11B:
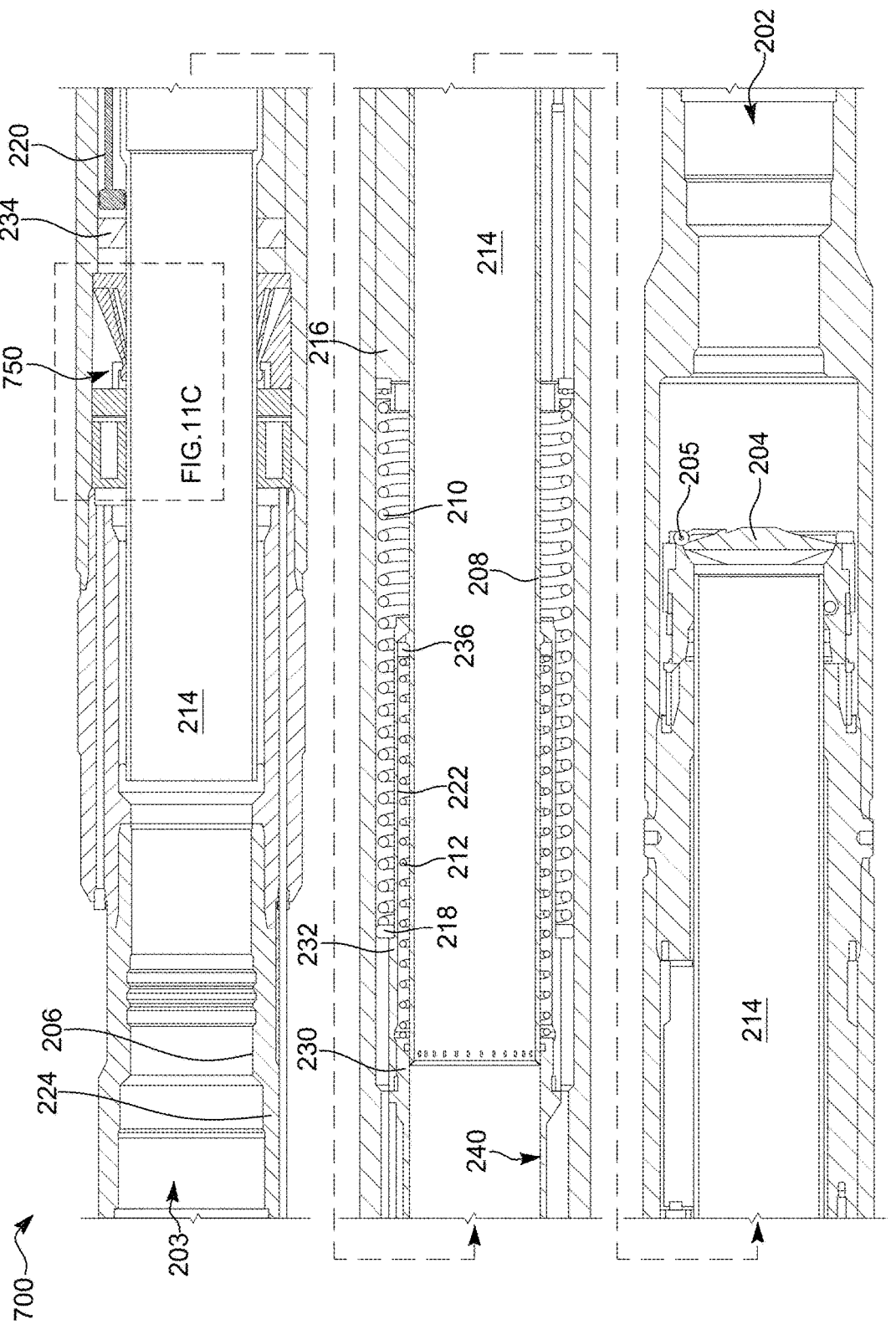
Figure 11C:
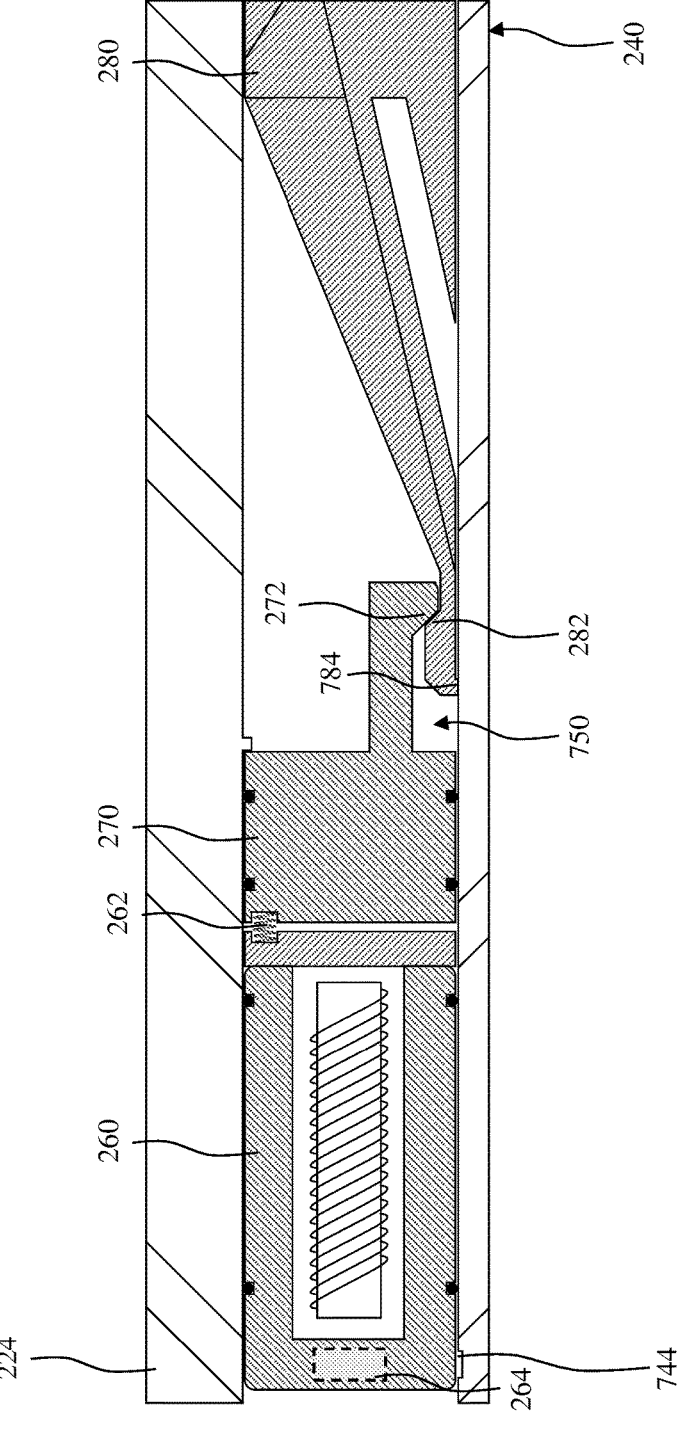
Figure 12A:
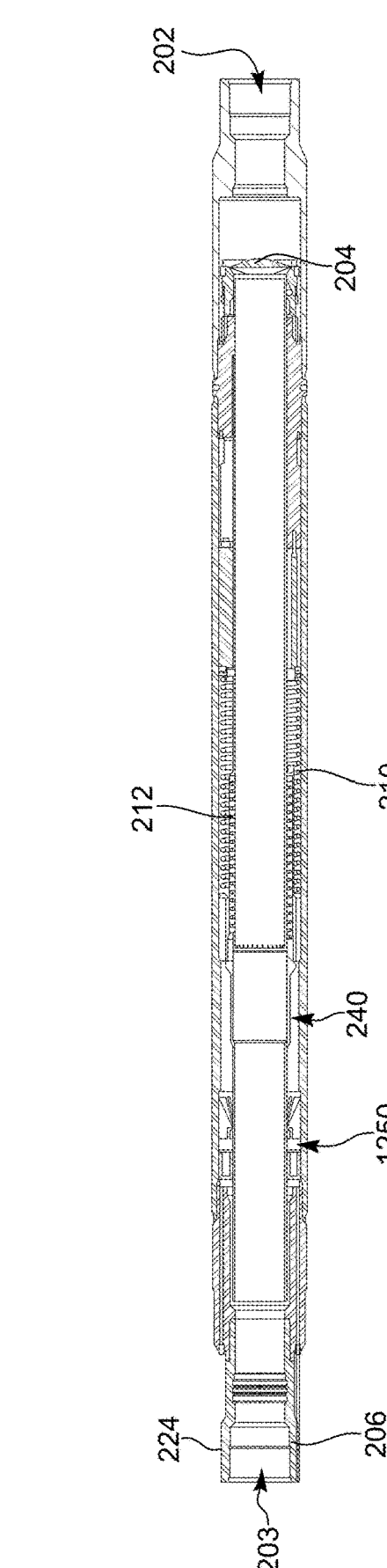
FIGS. 12A through 16C illustrate one embodiment of an SSSV designed, manufactured and/or operated according to one or more alternative embodiments of the disclosure.
Figure 12B:
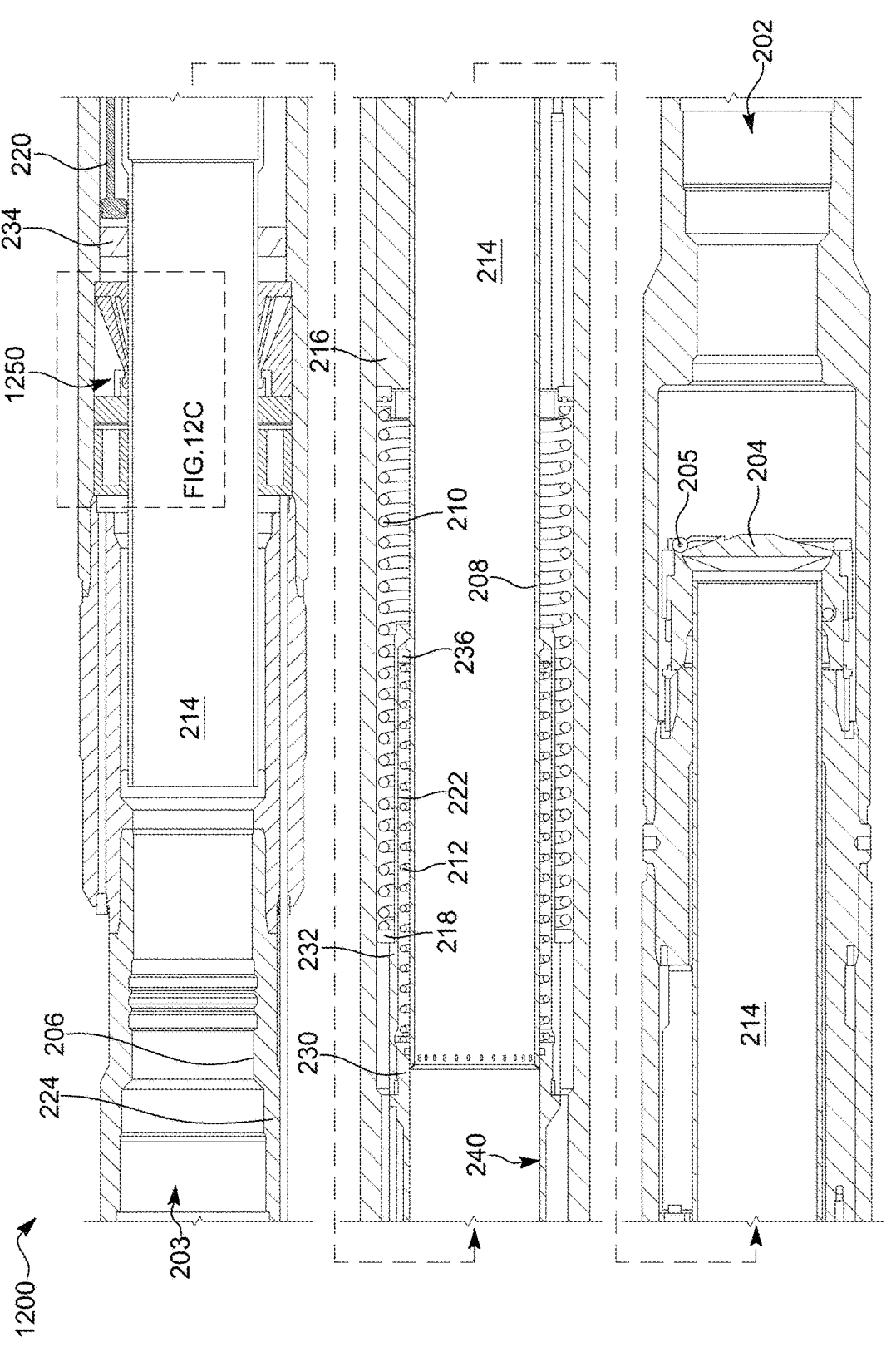
Figure 12C:
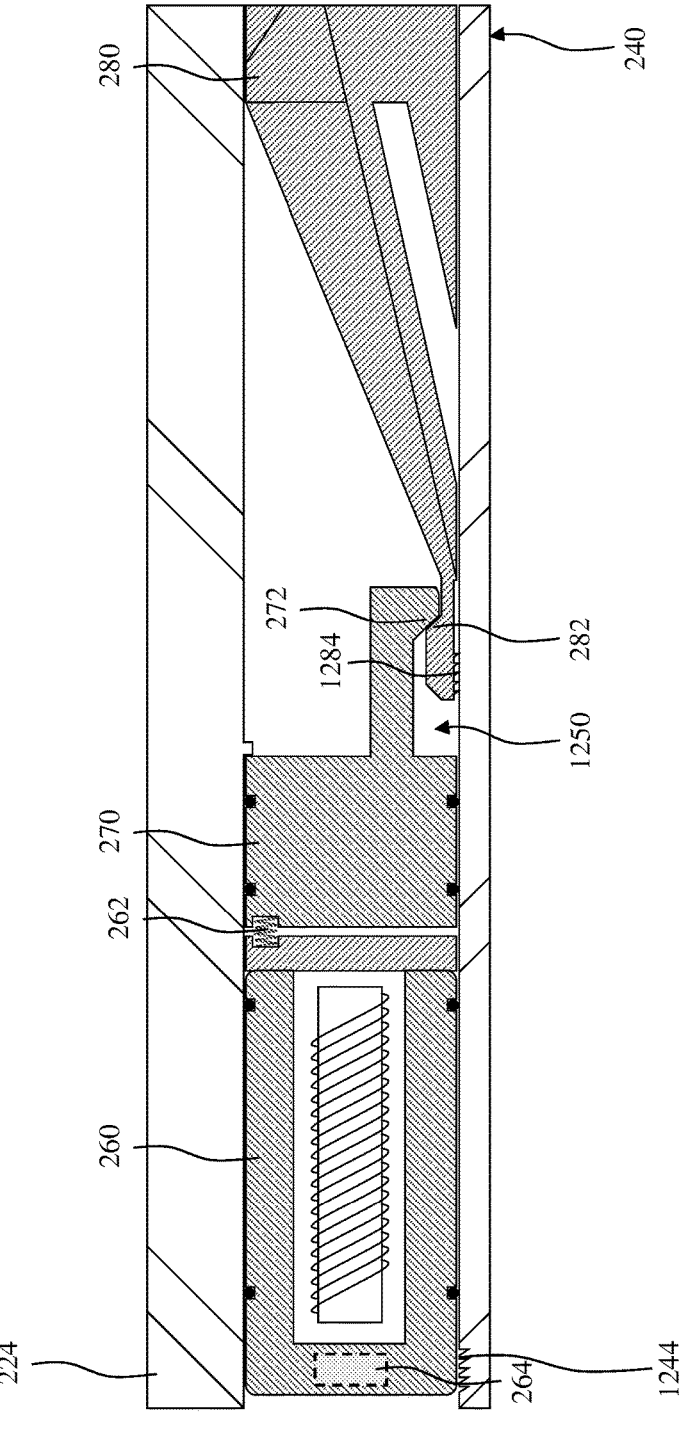
Figure 13A:
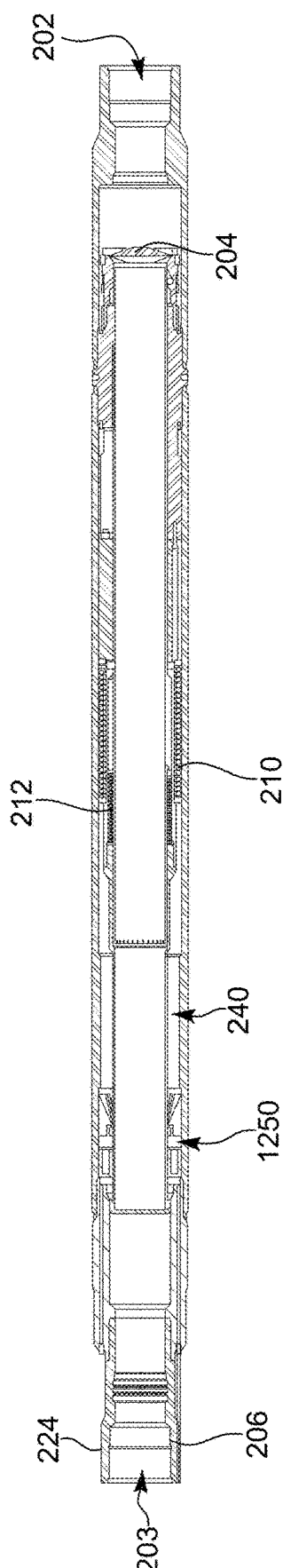
Figure 13B:
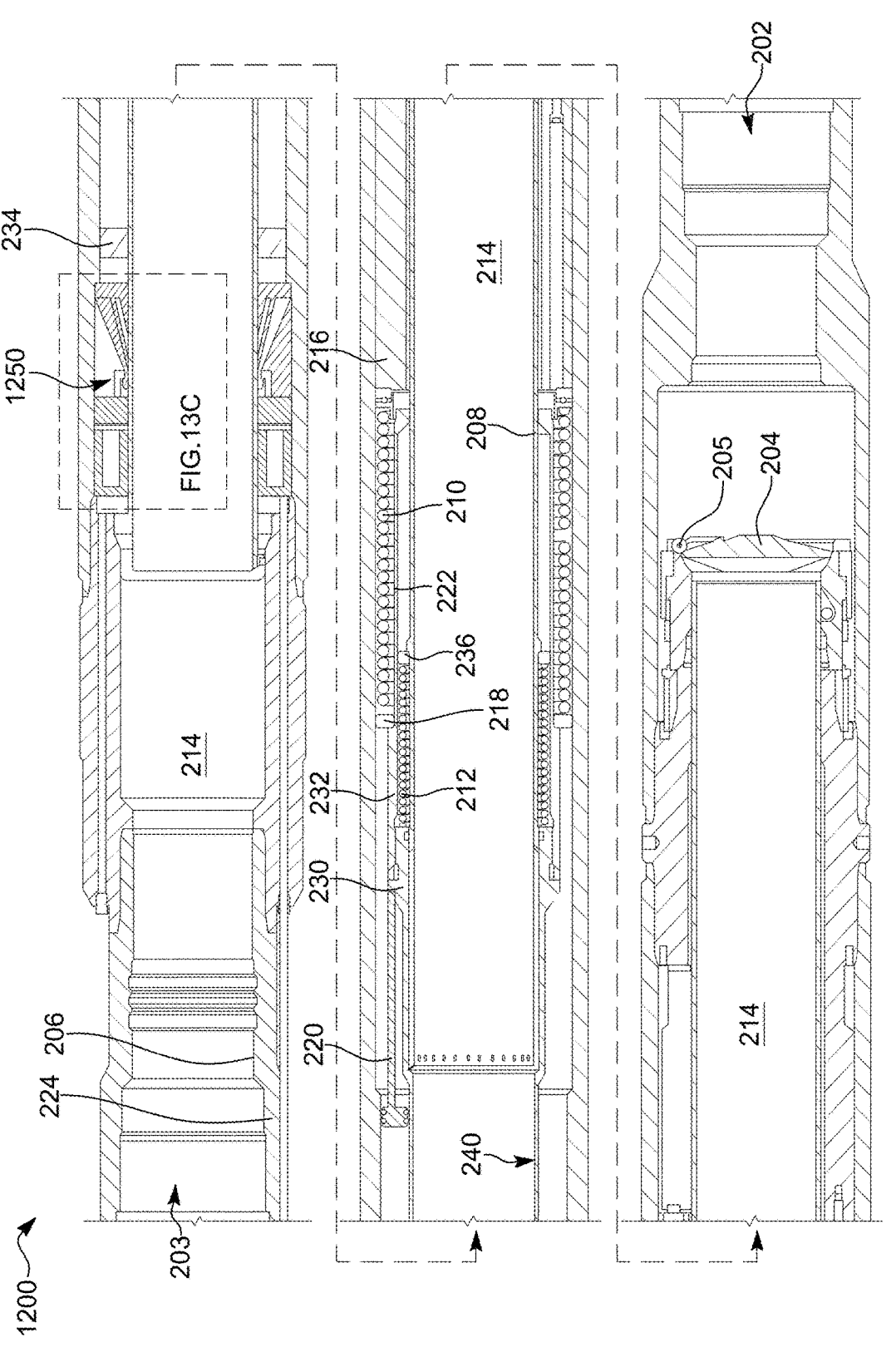
Figure 13C:
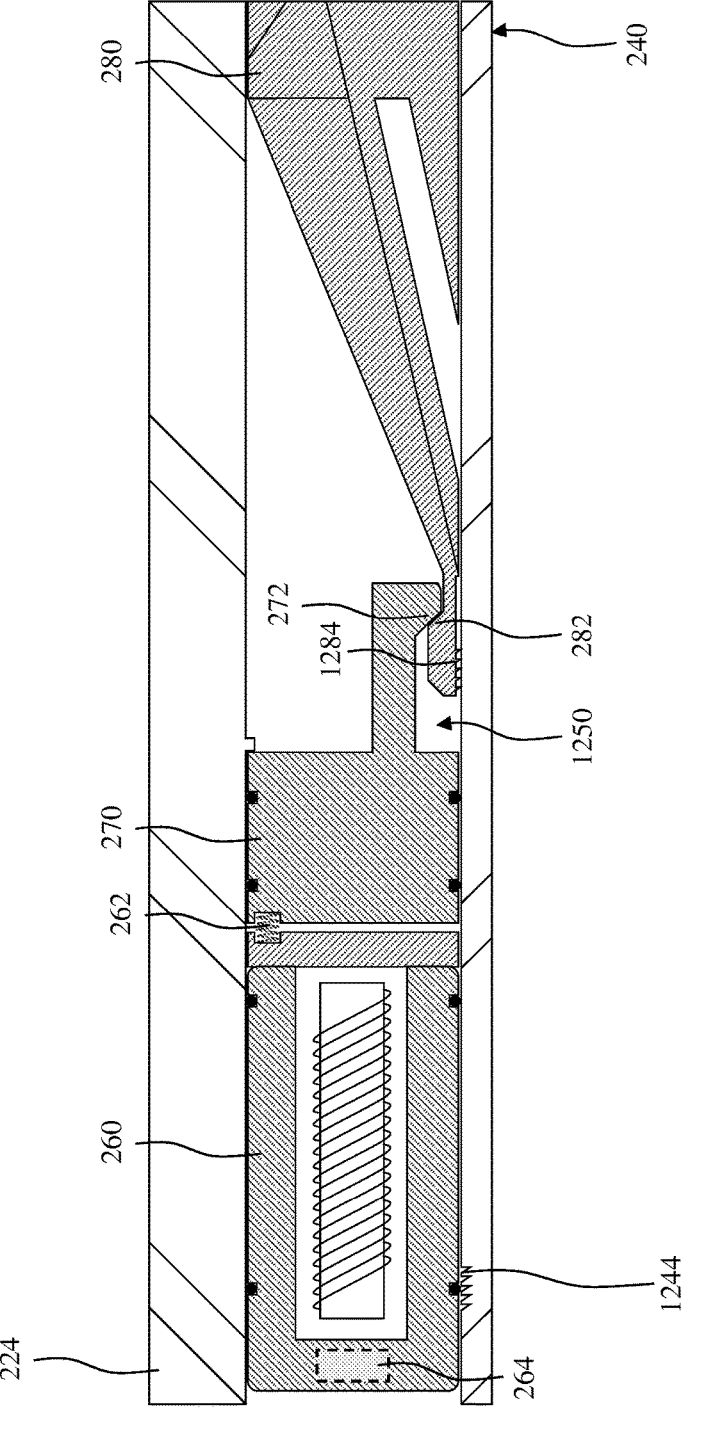
Figure 14A:
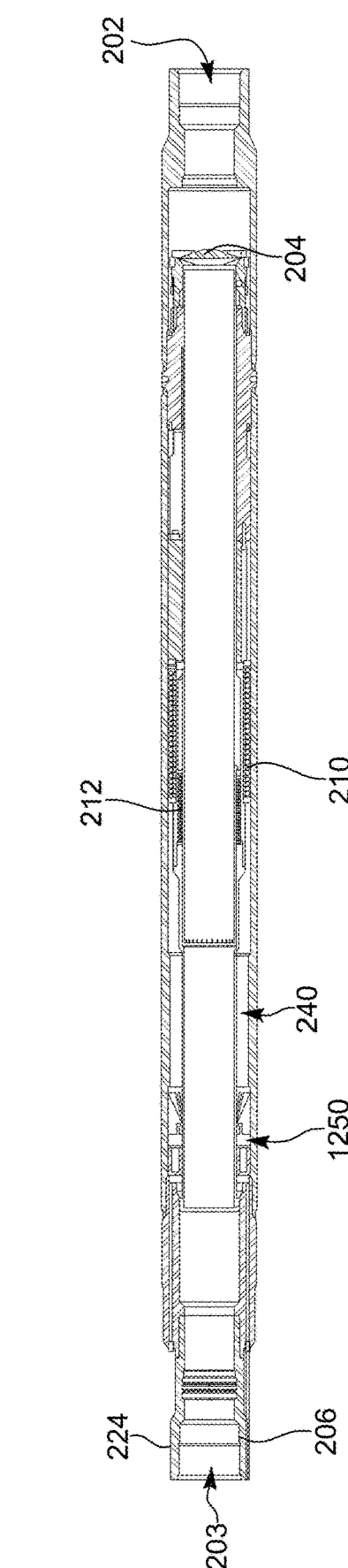
Figure 14B:
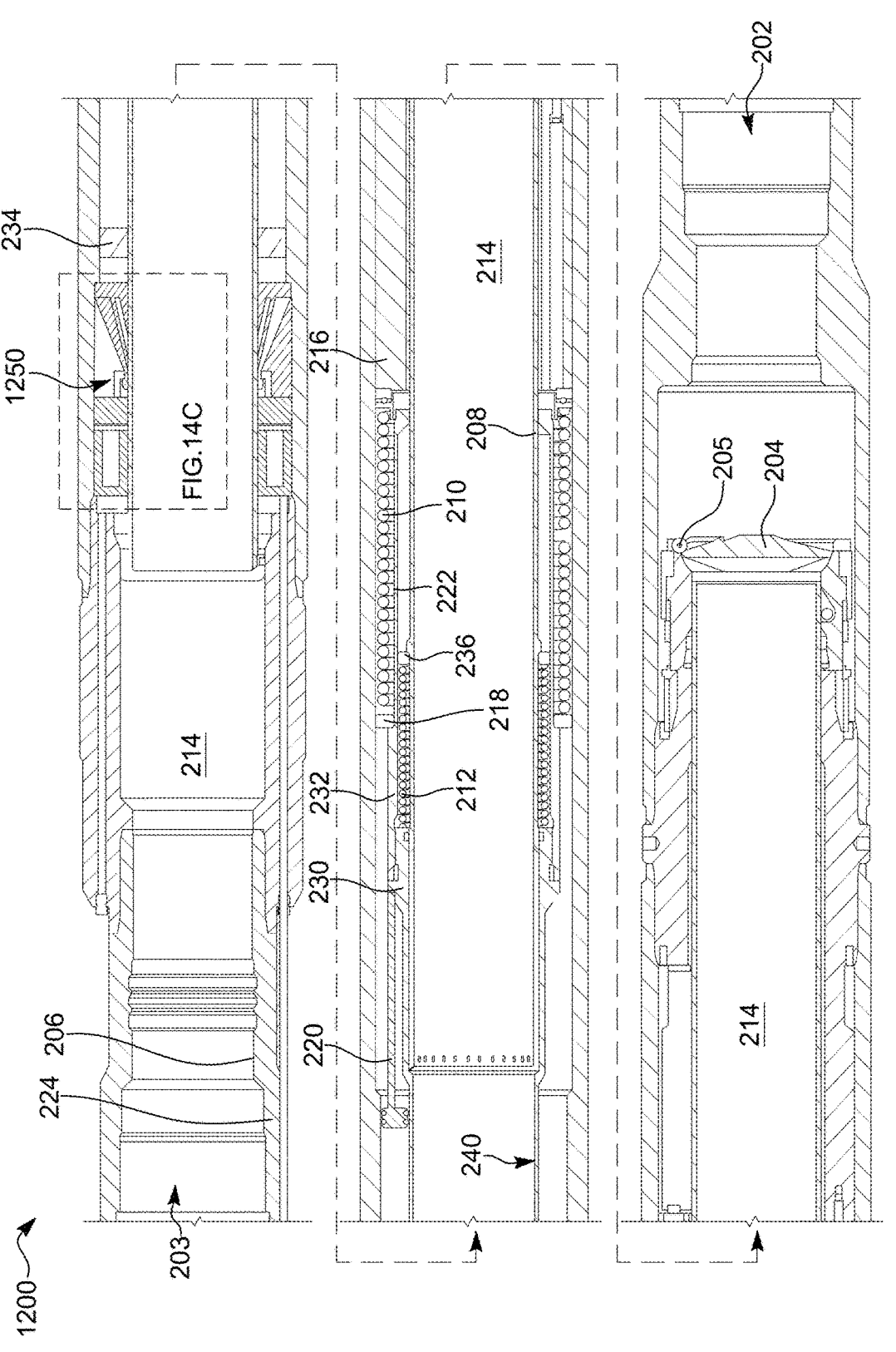
Figure 14C:
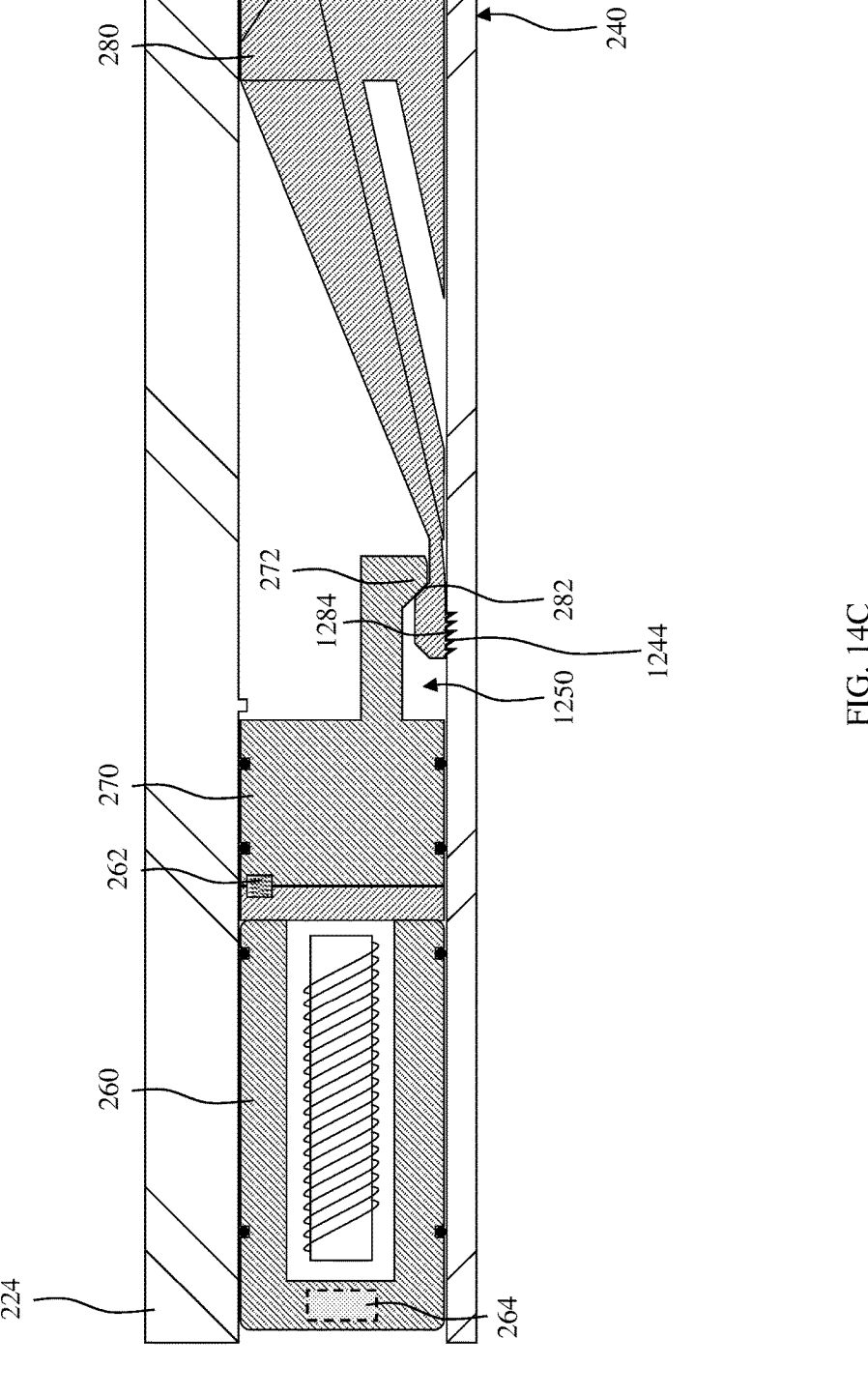
Figure 15A:
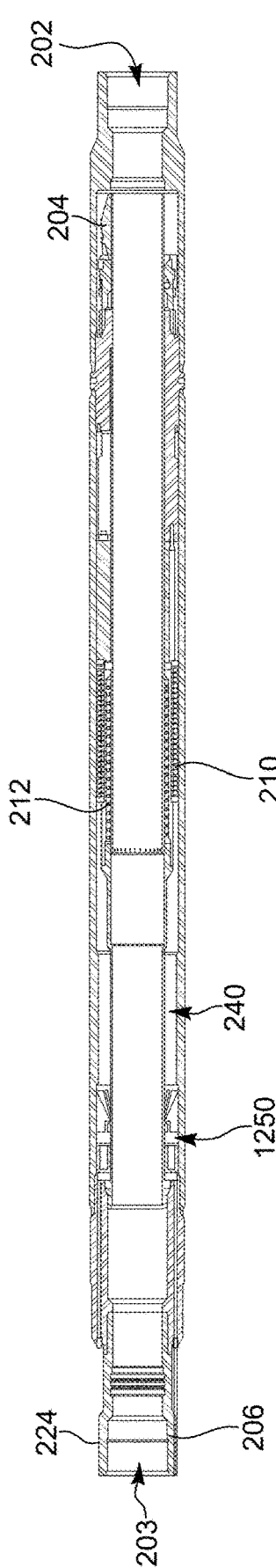
Figure 15B:
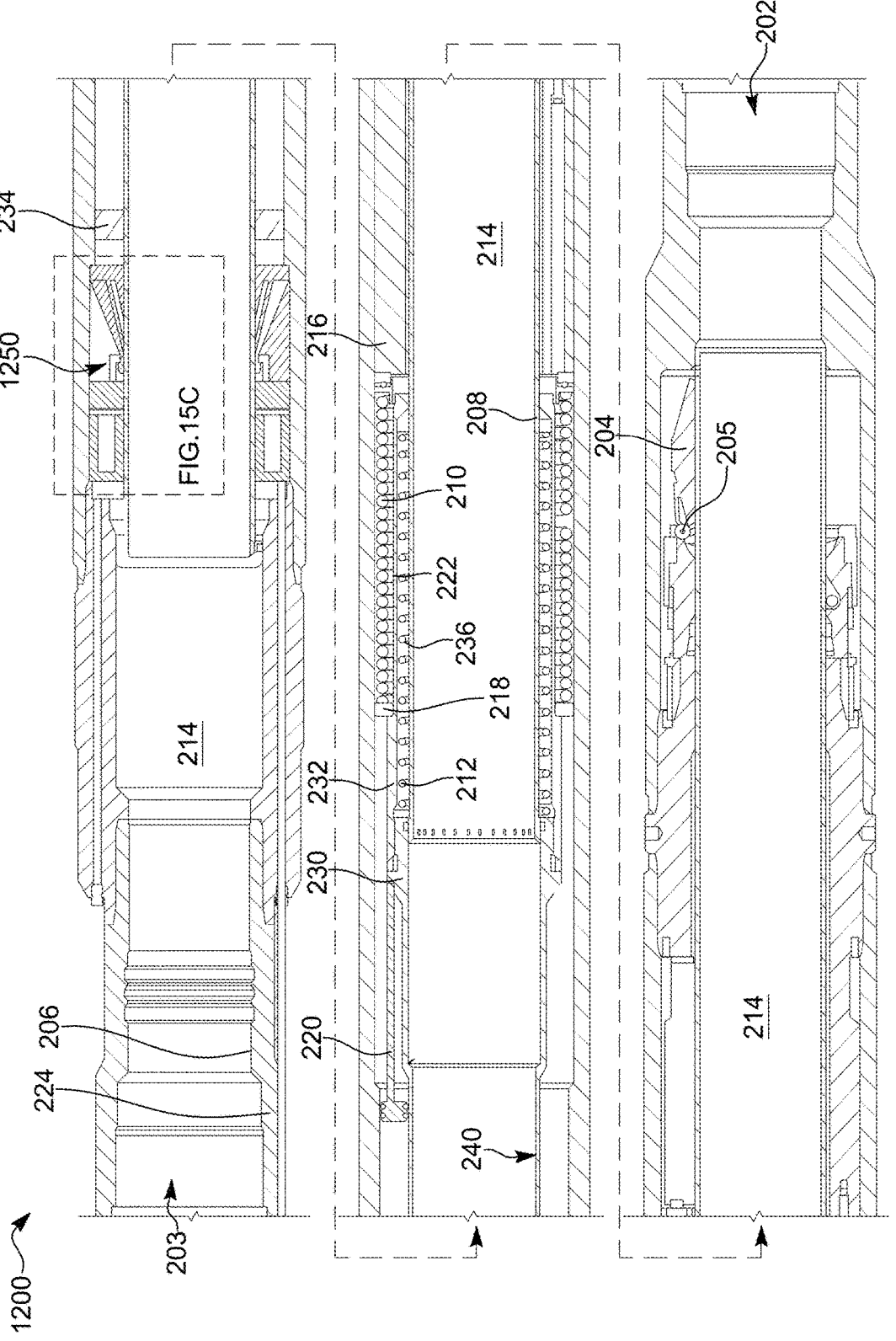
Figure 15C:
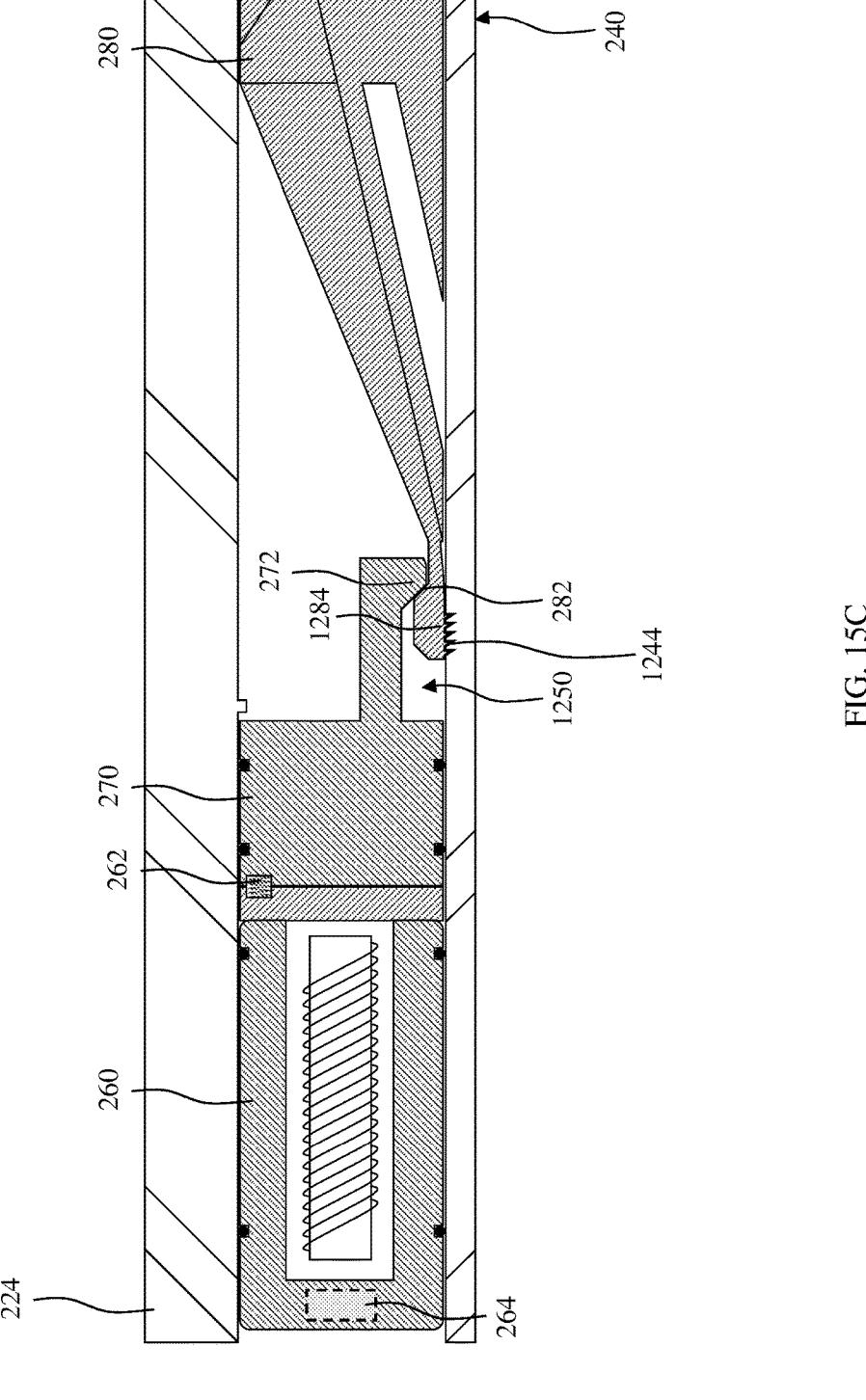
Figure 16A:
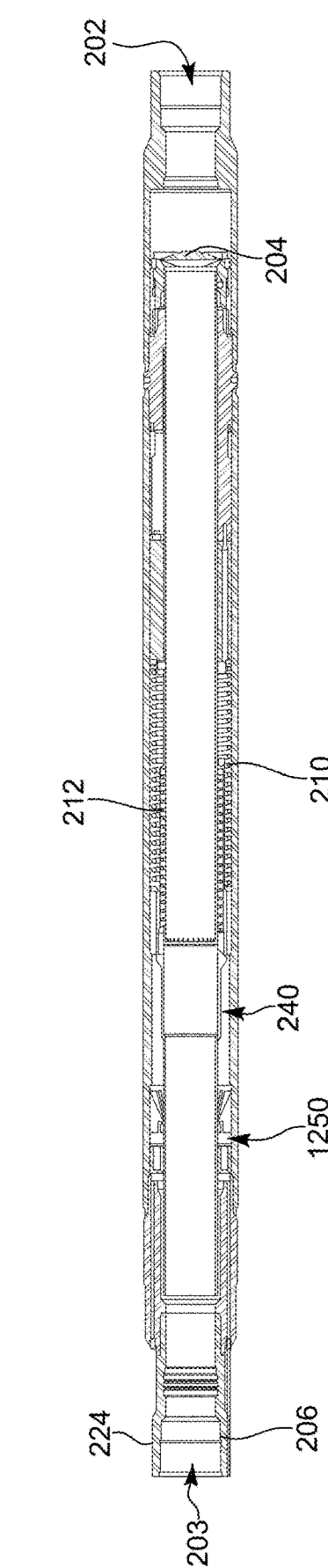
Figure 16B:
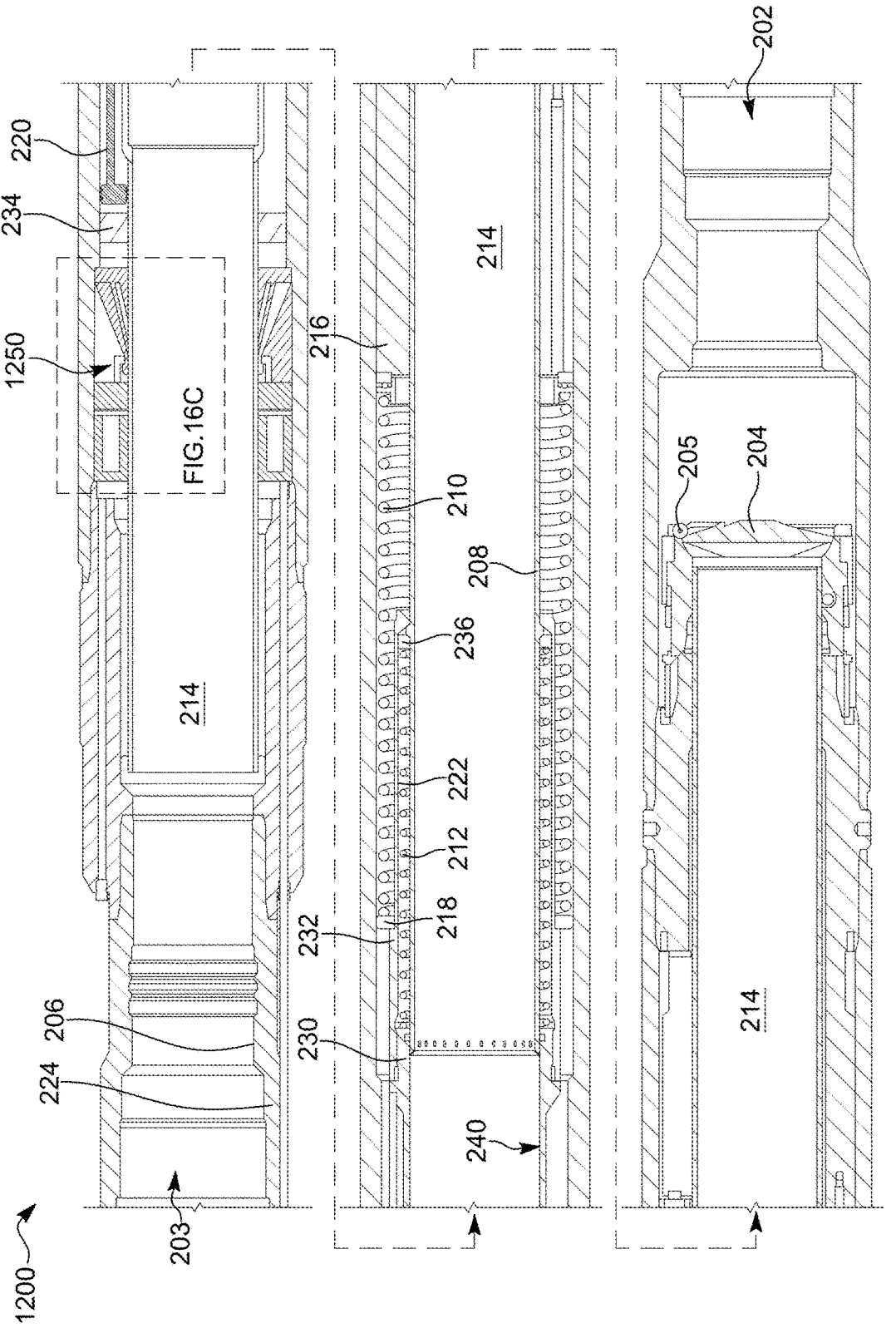
Figure 16C:
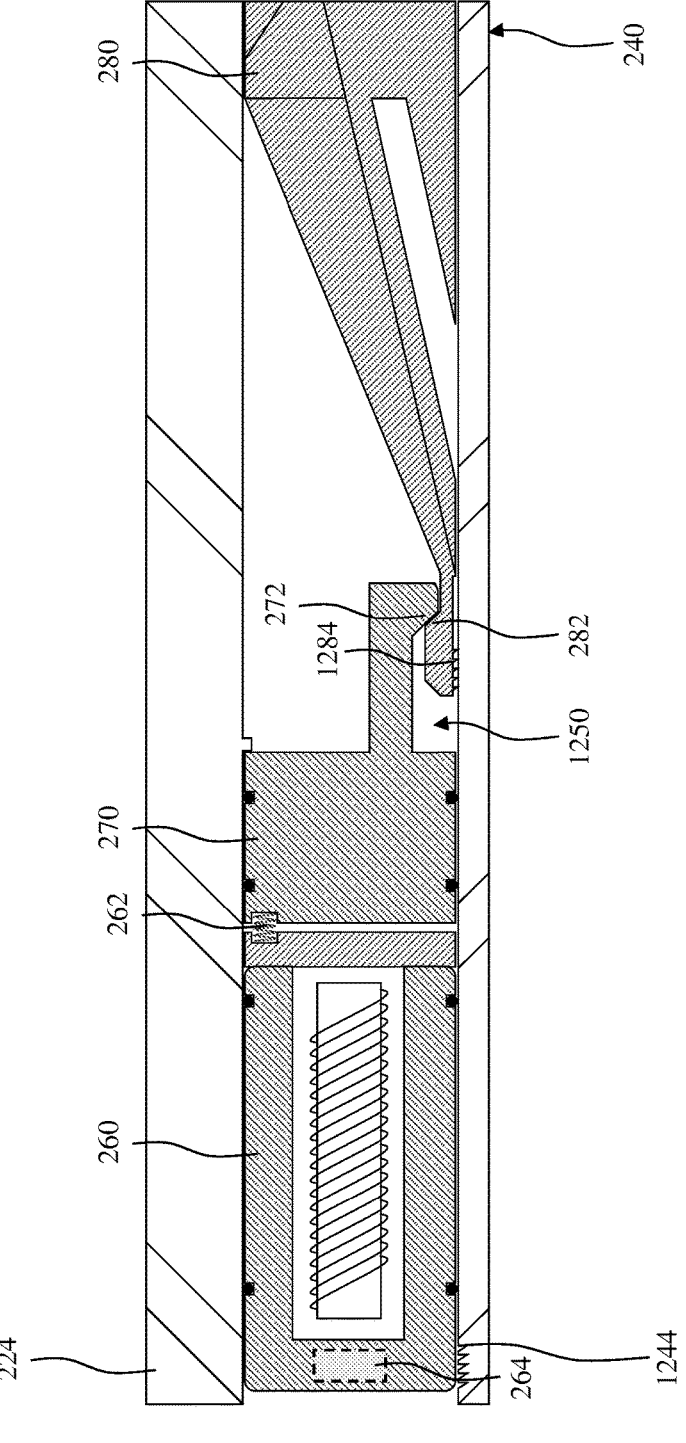

Turning to FIGS. 2A through 6C illustrated is one embodiment of an SSSV 200 designed, manufactured and/or operated according to one or more embodiments of the disclosure. FIGS. 2A through 2C illustrate the SSSV 200 in a first closed position (e.g., with its power spring and nose spring uncompressed, and its valve in a closed position). FIGS. 3A through 3C illustrate the SSSV 200 in a second closed position (e.g., with its power spring and nose spring compressed, but it valve still in a closed position). FIGS. 4A through 4C illustrate the SSSV 200 in a second closed position (e.g., with its power spring and nose spring com-pressed, but it valve still in a closed position), and with the axial brake portion locked. FIGS. 5A through 5C illustrate the SSSV 200 in an open position (e.g., with its power spring still compressed but its nose spring uncompressed, and its valve in an open position). FIGS. 6A through 6C illustrate the SSSV 200 in a third closed position (e.g., similar to the first closed position, and thus with its power spring and nose spring uncompressed, and its valve in a closed position).

The SSSV 200 may be disposed in a wellbore as part of a wellbore completion string. The wellbore may penetrate a subterranean formation that contains formation fluids such as oil, gas, water, or any combination thereof. The formation fluids may flow from the subterranean formation into the wellbore, into a lower section 202 of the SSSV 200, through a bore 206 of the SSSV 200, and past an upper section 203 of the SSSV 200. The lower section 202 may be fluidically coupled to a lower portion of bore 206 and therefore may be exposed to formation fluids and pressure, as a function of being in fluid communication with fluids present in the wellbore. The lower section 202 may be fluidically coupled to a production tubing string disposed in the wellbore, for example. The upper section 203 may also be fluidically coupled to a production tubing string disposed in the well-bore.

Figure 2B:
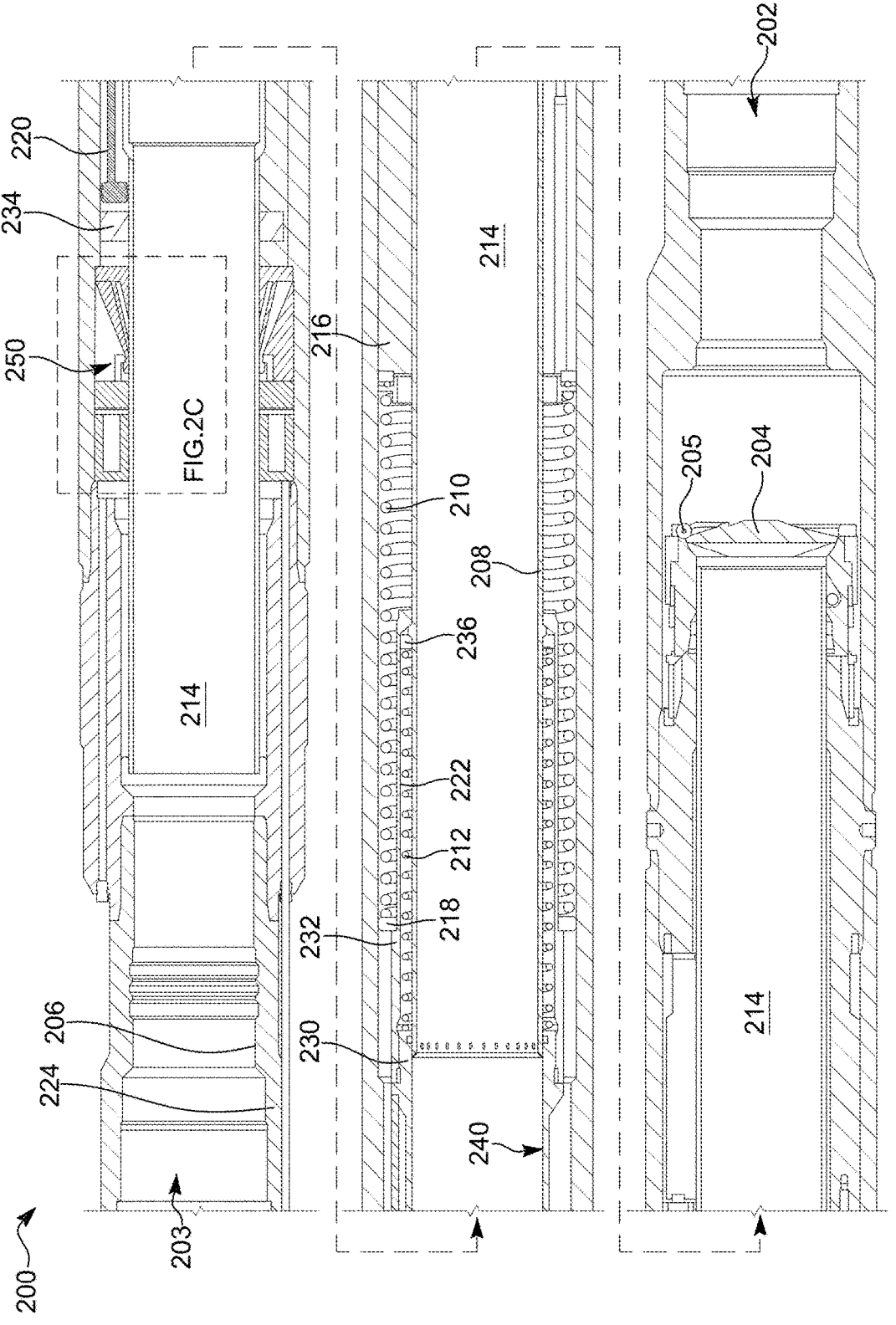
Figure 2C:
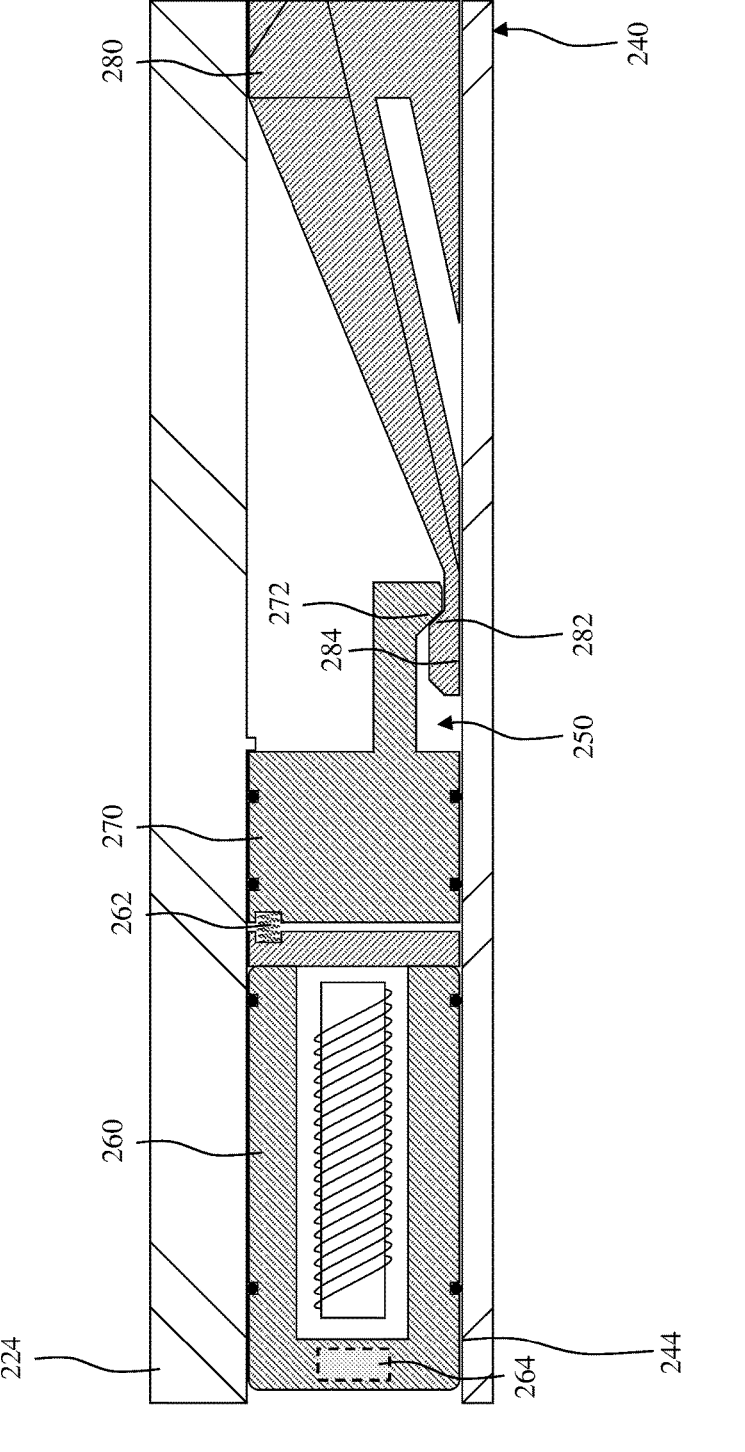

Referring initially to FIGS. 2A through 2C, the SSSV 200 is illustrated in a first closed position. The SSSV 200 may include a housing 224 containing a bore 206 therein, wherein certain components of the SSSV 200 may be disposed within the bore 206. An upper valve assembly 234 may be attached to the housing 224 and may further include one or more sealing elements, such that fluid communication from a lower section 202 to an upper section 203 is prevented.

In the illustrated embodiment, a flow tube 240 may be disposed within the housing 224. The flow tube 240 may include a translating sleeve 222 and a flow tube main body 208. A flow path 214 may be defined by an interior of the flow tube main body 208. As illustrated in FIGS. 2A through 2C, the flow path 214 may extend from an interior of the bore 206 through an interior of flow tube main body 208. As will be discussed in further detail below, when the SSSV 200 is in an open position (e.g., as shown in FIGS. 4A through 4C), the flow path 214 may extend from an interior of bore 206 through an interior of the flow tube main body 208 and further into the lower section 202.

A power spring 210 may be disposed between the lower valve assembly 216 and a translating sleeve shoulder 218. As illustrated in FIGS. 2A through 2C, the translating sleeve shoulder 218 and an uphole flow tube shoulder 232 may be in contact when the SSSV 200 is in the first closed position. The power spring 210 may provide a positive spring force against the translating sleeve shoulder 218, which may keep the flow tube main body 208 in a first flow tube main body position (e.g., that shown in FIGS. 2A through 2C). The power spring 210 may also provide a positive spring force to return the flow tube main body 208 to the first flow tube main body position and the translating sleeve 222 to its first translating sleeve position, as shown in FIGS. 2A through 2C, from the second flow tube main body position and the second translating sleeve position (e.g., that shown in FIGS. 3A through 5C), as will be explained below.

A nose spring 212 may be disposed between a translating sleeve assembly 230 and a downhole flow tube shoulder 236. The translating sleeve assembly 230 may be disposed between and attached to a piston 220 and the translating sleeve 222. Although only one piston 220 is illustrated in FIGS. 2A through 5C, there may be multiple pistons attached to the translating sleeve 222. The power spring 210 and the nose spring 212 are depicted as coiled springs in FIGS. 2A through 6C. However, the power spring 210 and the nose spring 212 may include any kind of spring, such as, for example, coil springs, wave springs, or fluid springs, and remain within the scope of the disclosure.

The translating sleeve assembly 230 may allow a force applied to a distal end of the piston 220 to be transferred into the translating sleeve 222. A force may be applied to the distal end of the piston 220 by way of fluid communication from a channel and orifice, whether provided from below the SSSV 200 or above the SSSV 200 (e.g., from the surface). A force applied to the piston 220 may move the translating sleeve 222 from the first translating sleeve position (e.g., FIGS. 2A through 2C) to the second translating sleeve position (e.g., FIGS. 3A through 5C). The nose spring 212 may provide a positive spring force against the translating sleeve assembly 230 and the downhole flow tube shoulder 236, which may move the translating sleeve 222 from its second translating sleeve position to its first translating sleeve position, as will be discussed in greater detail below.

When the SSSV 200 is in the first closed position, the translating sleeve 222 and the flow tube main body 208 are positioned such that the translating sleeve shoulder 218 and the uphole flow tube shoulder 232 are in contact, and the power spring 210 and the nose spring 212 are in an extended position. When the SSSV 200 is in the first closed position, the translating sleeve 222 may be referred to as being in the first translating sleeve position and flow tube main body 208 may be referred to as being in the first flow tube main body position.

When the SSSV 200 is in the first closed position, a valve 204 may be in a closed position (e.g., as in FIGS. 2A through 3C and 5A through 5C), thereby isolating the lower section 202 from the flow tube main body 208. When the valve 204 is in such a closed position, the valve 204 may prevent formation fluids and pressure from flowing into the flow tube main body 208. Although FIGS. 2A through 6C illustrates the valve 204 as a flapper valve, the valve 204 may be any suitable type of valve, such as a flapper type valve or a ball type valve, for example. As will be illustrated in further detail below, the valve 204 may be actuated into an open position to allow formation fluids to flow from the lower section 202 through the flow path 214 defined by the lower section 202, an interior of the flow tube main body 208 and an interior of the bore 206 and ultimately to the upper section 203. The bore 206 may be coupled to an upper portion of the conduit shown in FIG. 1.

When the SSSV 200 is in the first closed position, no amount of differential pressure across the valve 204 will allow formation fluids to flow from lower section 202 and into the flow path 214. In the first closed position, the SSSV 200 will only allow fluid flow from bore 206 into the lower section 202, but not from the lower section 202 into the bore 206. In the instance that pressure in the bore 206 is increased, the valve 204 will remain in the closed position until the pressure in the bore 206 is increased above the pressure in the lower section 202 plus the closing pressure provided by a flapper spring 205 associated with the valve 204. This combined pressure is sometimes referred to as a valve opening pressure.

When the valve opening pressure is reached, the valve 204 may open and allow fluid communication from the bore 206 into the lower section 202. In this manner, treatment fluids such as surfactants, scale inhibitors, hydrate treatments, and other suitable treatment fluids may be introduced into the subterranean formation. The configuration of the SSSV 200 may allow treatment fluids to be pumped from a surface, such as a wellhead, into the subterranean formation without actuating a control line or balance line to open the valve. Once pressure in the bore 206 is decreased below the valve opening pressure, the flapper spring 205 may cause the valve 204 to return to the closed position, and flow from the bore 206 into the lower section 202 may cease. When the valve 204 has returned to the closed position, flow from the lower section 202 into the flow path 214 may be prevented. Should a pressure differential across the valve 204 be reversed such that pressure in the lower section 202 is greater than a pressure in the bore 206, the valve 204 will remain in a closed position such that fluids in the lower section 202 are prevented from flowing into the bore 206.

Turning to FIG. 2C, illustrated is an exploded view of an axial brake portion 250 of the SSSV 200 of FIGS. 2A and 2B. FIG. 2C illustrates additional detail how the axial brake portion 250 may be designed, manufactured and/or operated according to one or more embodiments of the disclosure. As shown, the axial brake portion 250 may include an electromagnet 260 fixedly coupled to the housing 224. The axial brake portion 250 may additionally include a target 270 positioned proximate the electromagnet 260. In the illustrated embodiment, the target 270 is configured to remain in an axially distal position (e.g., as shown in FIGS. 2C, 3C, 6C) when the electromagnet 260 is not energized, but will be axially drawn toward and held in an axially proximal position by the electromagnet 260 when the electromagnet 260 is energized (e.g., as shown in FIG. 4C). In the illustrated embodiment, the target 270 includes an angled target surface 272. The target 270 may include any material that has a magnetic attraction to the electromagnet 260 when the electromagnet 260 is energized.

The axial brake portion 250, in one or more embodiments, further includes a radially compressible member, such a collet 280, located radially between the flow tube 240 and the housing 224. It should be noted that the radially compressible member, as disclosed herein, has been primarily described and illustrated at a collet. Nevertheless, other radially compressible members, such as a snap ring and others, are within the scope of the present disclosure. Accordingly, unless otherwise required, the present disclosure should not be limited to any specific radially compressible member. In at least one embodiment, the collet 280 is engageable with the target 270 and configured to move between a radially extended state (e.g., as shown in FIGS. 2C, 3C, 6C) when the electromagnet 260 is not energized and the target 270 is in the axially distal position (e.g., as shown in FIGS. 2C, 3C, 6C), for example to allow the flow tube 240 to move between the closed state and the open state, and a radially compressed state (e.g., as shown in FIGS. 4C and 5C) when the electromagnet 260 is energized and the target 270 is in the axially proximal position (e.g., as shown in FIGS. 4C and 5C), for example to ultimately hold the flow tube in the flow state. In the illustrated embodiment, the collet 280 includes a plurality of collet fingers, and is fixedly coupled to the housing 224, much like the electromagnet 260.

The collet 280, in one or more embodiments, includes a reciprocal angled collet surface 282. Accordingly, in at least one embodiment, the angled target surface 272 of the target 270 is configured to slide upon the reciprocal angled collet surface 282 of the collet 280 as the electromagnet 260 is energized and the target 270 is drawn toward the electromagnet 260, and thus move the collet 280 to the radially compressed state (e.g., as shown in FIG. 4C). In the illustrated embodiment, the collet 280 has a collet friction surface 284 along a radially interior surface thereof and the flow tube 240 has a reciprocal flow tube friction surface 244 along a radially exterior surface thereof. In this embodiment, the collet friction surface 284 is configured to engage with the reciprocal flow tube friction surface 244 when the electromagnet 260 is energized, the target 270 is in the axially proximal position and the collet 280 is in the radially compressed state, to ultimately hold the flow tube 240 in the flow state.

In at least one embodiment, the SSSV 200 may additionally include a return mechanism 262 coupled to the target 270. In this embodiment, the return mechanism 262 is configured to return the target 270 to the axially distal position when the electromagnet 260 is not energized. In the illustrated embodiment, the return mechanism 262 is positioned between the electromagnet 260 and the target 270, and is thus configured to push the target 270 back toward the axially distal position. In yet another embodiment (e.g., not shown), the return mechanism 262 is positioned on an opposite side of the target 270, and thus is configured to pull the target 270 back toward the axially distal position. In even yet another embodiment, no dedicated return mechanism 262 is used, but a radially outward spring force of the collet 280 is employed to return the target 270 back toward the axially distal position. In such an embodiment, the collet 280 may be to some extent compressed at all times, and thus the radially extended state is actually a first compressed state and the radially compressed state is actually a second more compressed state.

In at least one embodiment, for example an embodiment such as that shown in FIGS. 2A through 6C, the SSSV 200 may additionally include a safety mechanism 264. In this embodiment, the safety mechanism 264 is configured to prevent the collet 280 from restricting axial movement of the flow tube 240 unless the flow tube 240 is in the flow state (e.g., as shown in FIGS. 4A through 5C). The safety mechanism 264 may take on a variety of different forms and remain within the scope of the disclosure. Nevertheless, in at least one embodiment, such as that shown in FIGS. 2A through 6C, the safety mechanism 264 is an electromagnet safety mechanism. In this embodiment, the electromagnet safety mechanism is configured to prevent the electromagnet 260 from being energized unless the flow tube 240 is in the flow state.

In at least one embodiment, an area between the electromagnet 260 and the target 270 is isolated from wellbore fluid and/or other debris that could limit the holding force capacity, as discussed above. For example, in at least one embodiment the area between the electromagnet 260 and the target 270 is isolated from wellbore fluid and/or other debris using one or more seals. In yet another embodiment, an isolation fluid (e.g., clean fluid), is located in the area between the electromagnet 260 and the target 270, to thus provide further isolation.

In the embodiment of FIGS. 2A through 2C, the electromagnet 260 is not energized. Accordingly, the target 270 remains in the axially distal position. As the target 270 remains in the axially distal position, the collet 280 may remain in its radially extended state, and thus the flow tube 240 is allowed to axially slide relative to the collet 280 (e.g., move between the closed state and the open state).

Turning now to FIGS. 3A through 3D, illustrated is the SSSV 200 in its second closed position. In the second closed position, the translating sleeve 222 may be displaced from the first translating sleeve position to the second translating sleeve position, which is relatively closer in proximity to the valve 204. The flow tube main body 208 may remain in the first flow tube main body position, or alternatively only slightly downhole from the first flow tube main body position. When the SSSV 200 is in the second closed position, both the power spring 210 and the nose spring 212 may be in a compressed state.

To move the translating sleeve 222 to the second translating sleeve position, differential pressure across the valve 204 may be increased by lowering the pressure in the bore 206 or increasing pressure in the lower section 202. Lowering pressure in the bore 206 or increasing pressure in the lower section 202 may cause fluid from the lower section 202 to flow through a channel defined between the sleeve and the housing 224 into an orifice. The orifice may allow fluid communication into a piston tube whereby fluid pressure may act on the proximal end of the piston 220. The force exerted by fluid pressure on the proximal end of the piston 220 may displace the piston 220 towards the valve 204 by transferring the force through the piston 220, the translating sleeve assembly 230, and the translating sleeve shoulder 218. The nose spring 212 may provide a spring force against the flow tube shoulder 232 and the translating sleeve assembly 230, and the power spring 210 may provide a spring force against the translating sleeve shoulder 218 and the lower valve assembly 216. While the embodiment discussed employs fluid pressure from below the valve 204 to move the translating sleeve 222 to the second translating sleeve position, other embodiments may exist wherein pressure from above the SSSV 200 (e.g., from the surface of the wellbore) is employed to move the translating sleeve 222 to the second translating sleeve position.

Collectively the spring forces from the power spring 210 and the nose spring 212 may resist the movement of the piston 220 until the differential pressure across the valve 204 is increased beyond the spring force provided from the power spring 210 and the nose spring 212. Increasing differential pressure may include decreasing pressure in the bore 206 such that the pressure in the lower section 202 is relatively higher than the pressure in the bore 206. When the differential pressure across the valve 204 is increased, the differential pressure across the piston 220 also increases. When the differential pressure across the valve 204 is increased beyond the spring force provided by the nose spring 212 and the power spring 210, the nose spring 212 and the power spring 210 may compress and allow the translating sleeve 222 to move into the second translating sleeve position. Differential pressure across the valve 204 may be increased by pumping fluid out of the bore 206, for example. In the instance that the lower section 202 is fluidically coupled to a non-perforated section of pipe or where there is a plug in the bore 206 fluidically coupled to the lower section 202 that prevents pressure being transmitted from the lower section 202 to the piston 220, a pressure differential across the valve 204 may be induced through pipe swell.

When the SSSV 200 is in the second closed position, the SSSV 200 remains safe, as no fluids from the lower section 202 can flow into the flow path 214 and to the upper section 203. In the second closed position, no amount of differential pressure across the valve 204 should cause the valve 204 to open to allow fluids from the lower section 202 to flow into the flow path 214, as the pressure from the lower section 202 is acting on the valve 204. If pressure is increased in the bore 206, the differential pressure across the valve 204 decreases and the translating sleeve 222 would move back to the first translating sleeve position illustrated in FIGS. 2A through 2C. Unlike conventional safety valves that generally require a control line to supply pressure to actuate a piston to move a translating sleeve, the SSSV 200 may only require pressure supplied by the wellbore fluids in the lower section 202 to move the translating sleeve.

Figure 3A:
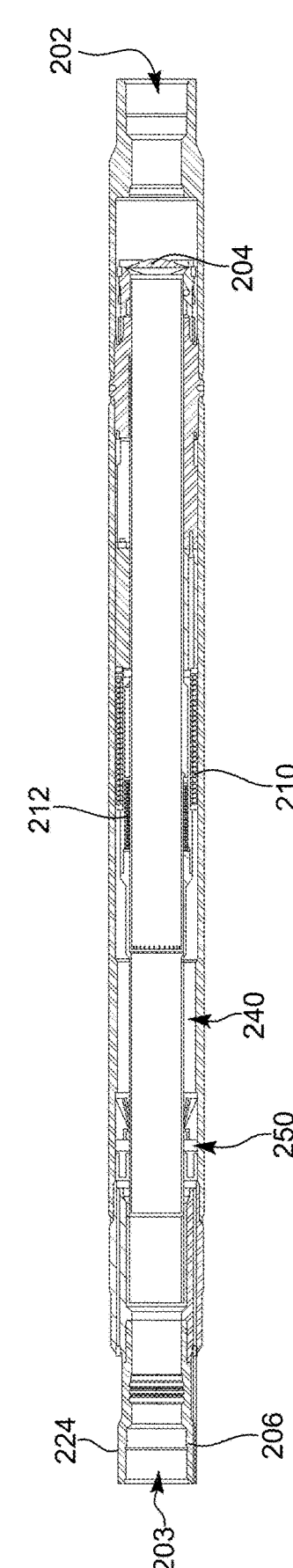
Figure 3B:
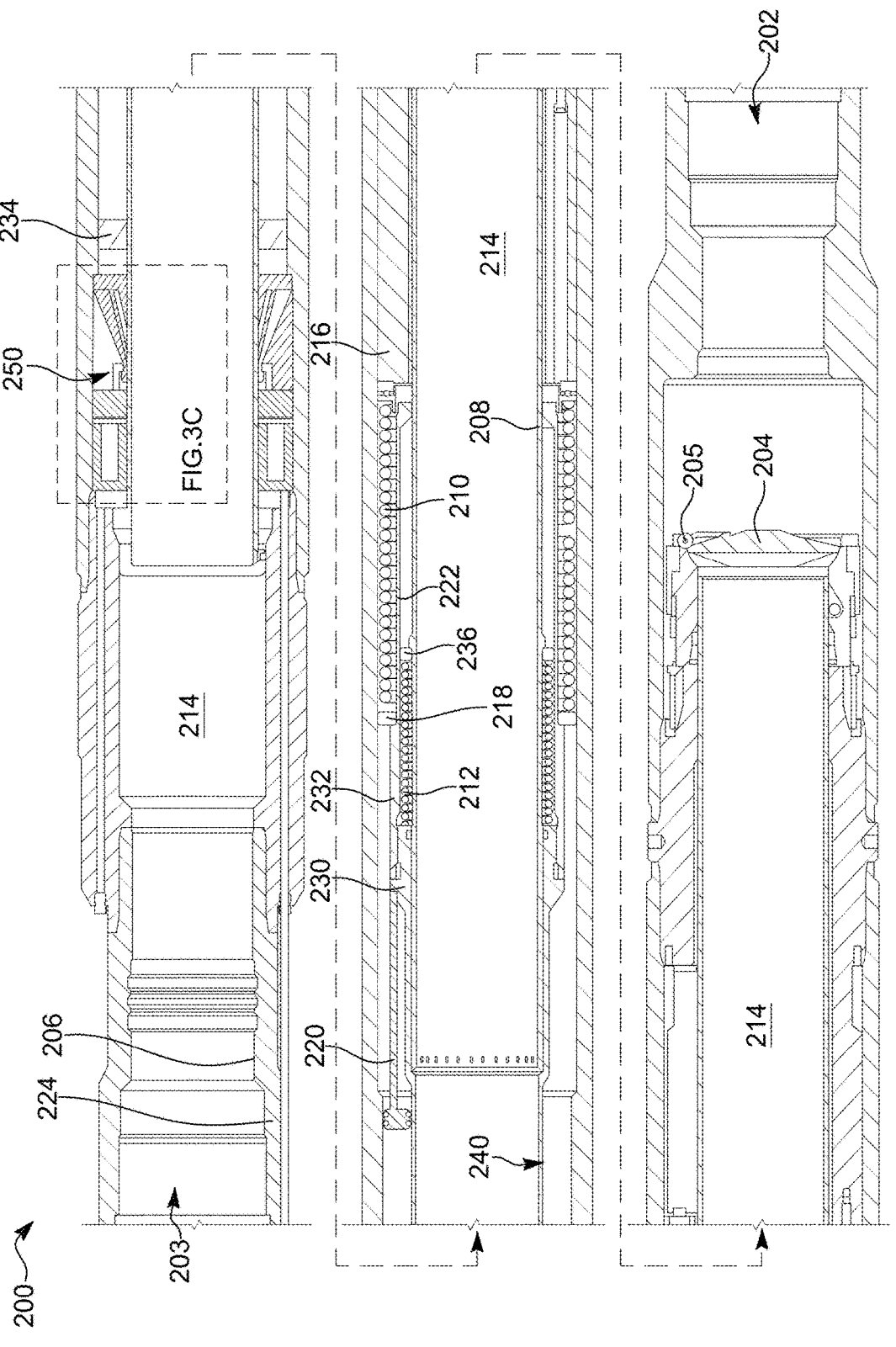
Figure 3C:
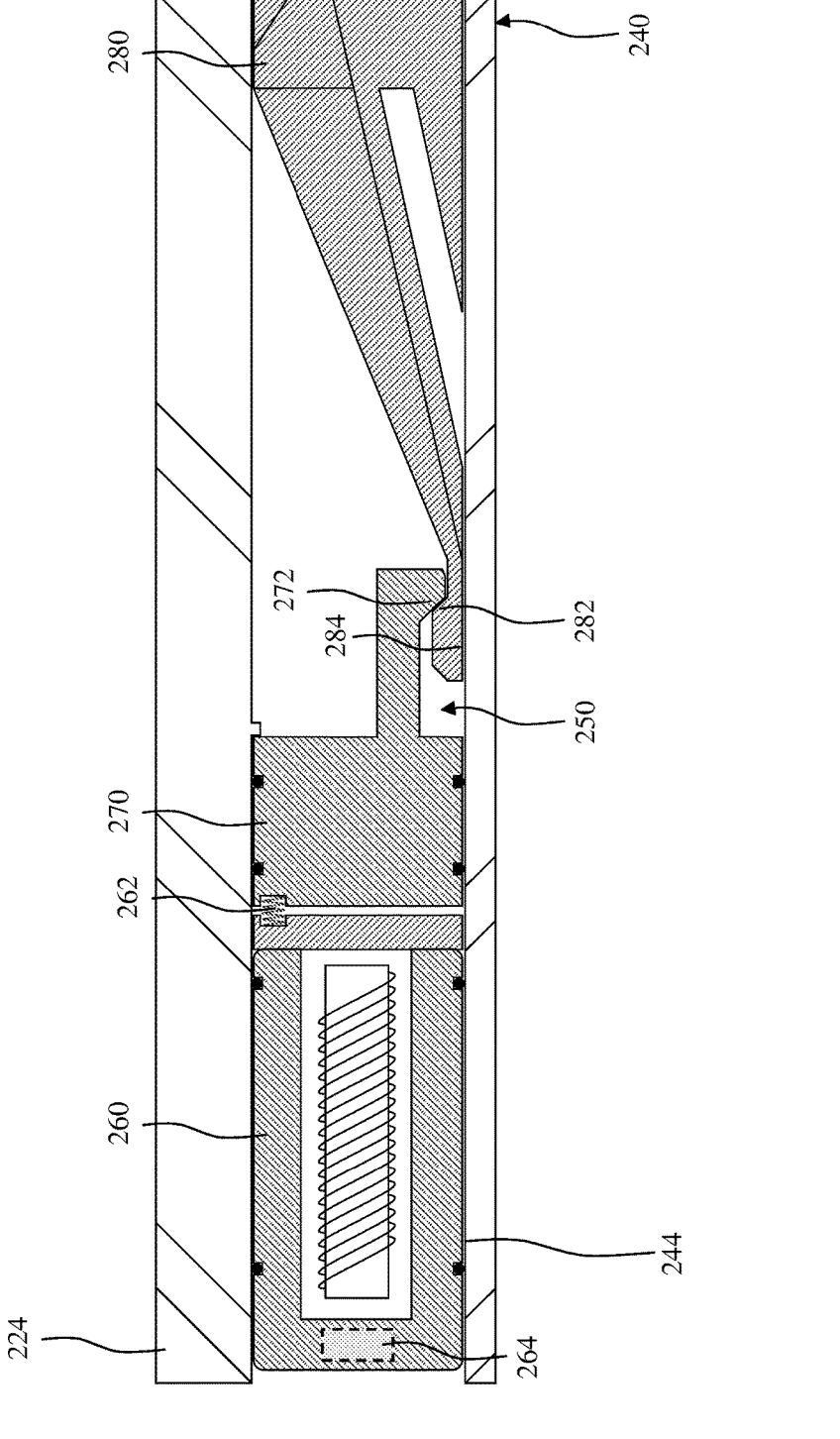

Turning to FIG. 3C, illustrated is an exploded view of an axial brake portion 250 of the SSSV 200 of FIGS. 3A and 3B. In the illustrated embodiment, the electromagnet 260 has yet to be energized, thus the target 270 remains in the axially distal position and therefore the collet 280 in its radially extended state. Accordingly, the collet 280 is not yet acting as an axial brake for the flow tube 240. At this stage, however, the flow tube 240 remains in the closed state (e.g., as a differential pressure remains across the valve 204).

With continued reference to FIGS. 4A through 4C, after the translating sleeve 222 is allowed to come to the second translating sleeve position, as described in FIGS. 3A through 3C above, the electromagnet 260 may be energized. The energizing of the electromagnet 260 pulls the target 270 to it, which in turn moves the collet 280 to its radially compressed state, for example to axially fix the movement of the flow tube 240, and ultimately hold the flow tube 240 in its flow state. Again, in the embodiment of FIGS. 4A through 4C, the collet friction surface 284 engages with the flow tube friction surface 244 to axially fix the flow tube 240.

Turning to FIG. 4C, illustrated is an exploded view of an axial brake portion 250 of the SSSV 200 of FIGS. 4A and 4B. In the illustrated embodiment, the electromagnet 260 has now been energized, and thus the target 270 has been axially drawn toward and held in the axially proximal position by the electromagnet 260. Similarly, with the target 270 in the axially proximal position, the collet 280 is now in the radially compressed state, and thus will ultimately hold the flow tube 240 in the flow state. At this stage, however, the flow tube 240 remains in the closed state (e.g., as there a differential pressure remains across the valve 204).

Turning to FIGS. 5A through 5C, the SSSV 200 is illustrated in an open position. The flow tube main body 208 is illustrated as being axially shifted from the first position illustrated in FIGS. 2A through 4C to the second position illustrated in FIGS. 5A through 5C. When the flow tube main body 208 is in the second position, the flow tube shoulder 232 and the translating sleeve shoulder 218 may be in contact, and the flow tube main body 208 may have displaced the valve 204 into an open position. The nose spring 212 may be in an uncompressed state, while the power spring 210 may be in a compressed state.

With the flow tube main body 208 in the second flow tube main body position, as shown in FIGS. 5A through 5C, the electromagnet 260 may remain energized. Again, the energizing of the electromagnet 260 pulls the target 270 to it, which in turn moves the collet 280 to its radially compressed state, for example to hold the flow tube 240 in the flow state. When the translating sleeve 222 is fixed in the second translating sleeve position through the force provided by the axial brake 250 (e.g., collet 280), the nose spring 212 may provide a positive spring force against the flow tube shoulder 232 and the translating sleeve assembly 230. The positive spring force from the nose spring 212 may be transferred through the flow tube main body 208 into the valve 204. The flow tube main body 208 will not move to the second position until differential pressure across the valve 204 is decreased after the translating sleeve 222 is fixed in position. The differential pressure may be decreased by pumping into the bore 206, thereby increasing the pressure in the bore 206. The pressure may be increased in the bore 206 until the differential pressure across the valve 204 is decreased to a point where the positive spring force from the nose spring 212 is greater than the differential pressure across the valve 204. Thereafter, the nose spring 212 may extend and move the flow tube main body 208 into the second position by acting on the translating sleeve assembly 230 and the flow tube shoulder 232. When the flow tube main body 208 is in the second flow tube main body position, fluids such as oil and gas in the lower section 202 may be able to flow into the flow path 214, to the upper section 203, and to a surface of the wellbore such as to a wellhead. The SSSV 200 may remain in the open position defined by the translating sleeve 222 being in the second translating sleeve position and the flow tube main body 208 being in the second flow tube main body position, so long as the electromagnet 260 remains energized.

Turning to FIGS. 6A through 6C, illustrated is the SSSV 200 of FIGS. 5A through 5C after de-energizing (e.g. powering off) the electromagnet 260. As previously discussed, the electromagnet 260 axially fixes the flow tube main body 208 in the second flow tube main body position when the electromagnet 260 remains energized (e.g., using the axial brake portion 250). When the electromagnet 260 is de-energized (e.g. powered off), the target 270 is allowed to return to the axially distal position, which in turn allows the collet to return to the radially extended state. Accordingly, the power spring 210 may provide a positive spring force against the lower valve assembly 216, the translating the sleeve shoulder 218, and the flow tube shoulder 232, through contact between the translating sleeve shoulder 218 and the flow tube shoulder 232. The positive spring force from the power spring 210 may axially displace the translating sleeve 222 to the first translating sleeve position and the flow tube main body 208 to the first flow tube main body position, thereby returning the SSSV 200 to the first closed position illustrated in FIGS. 2A through 2C.

In FIGS. 2A through 6C, the electromagnet 260 is depicted as one coil circumscribing a tubular, but the electromagnet 260 may include any number of coils in any orientation so as to fix the electromagnet 260 to the target 270, and thus axially fix the flow tube main body 208 in place. The electromagnet 260 may apply a force in a substantially axial direction, for example. The force applied by the electromagnet 260 may be any amount of force, including but not limited to, a force in a range of about 45 Newtons to about 45000 Newtons. The electromagnet 260 may provide a means to hold the target 270, and thus collet 280 and flow tube 240, at any well depth.

Hydraulic systems used in previous wellbore safety valves generally require control and balance lines to actuate and hold a valve open which may have pressure limitations. The limitations experienced by hydraulic systems may be overcome by using the electromagnet 260 described herein, as only well pressure is required to open the SSSV 200. Again, when flow tube 240 is in its first flow tube position, either when the electromagnet 260 is switched on or switched off, no amount of differential pressure across the valve 204 will open the valve 204 (e.g., the differential pressure being a pressure difference between a relatively higher pressure in the section 202 and a relatively lower pressure in the bore 206).

Turning to FIGS. 7A through 11C, illustrated is one embodiment of an SSSV 700 designed, manufactured and/or operated according to one or more alternative embodiments of the disclosure. The SSSV 700 of FIGS. 7A through 11C is similar in many respects to the SSSV 200 of FIGS. 2A through 6C. Accordingly, like reference numbers have been used to indicate similar, if not identical, features. The SSSV 700 of FIGS. 7A through 11C differs, for the most part, from the SSSV 200 of FIGS. 2A through 6C, in that the SSSV 700 employs an axial brake portion 750 having a collet engaging profile 784 along a radially interior surface of the collet 280 and the flow tube 240 has a reciprocal flow tube engaging profile 744 along a radially exterior surface thereof. In this embodiment, the collet engaging profile 784 is configured to engage with the reciprocal flow tube engaging profile 744 when the electromagnet 260 is energized, the target 270 is in the axially proximal position and the collet 280 is in the radially compressed state, for example to hold the flow tube 240 in the flow state.

Turning to FIGS. 12A through 16C, illustrated is one embodiment of an SSSV 1200 designed, manufactured and/or operated according to one or more alternative embodiments of the disclosure. The SSSV 1200 of FIGS. 12A through 16C is similar in many respects to the SSSV 700 of FIGS. 7A through 11C. Accordingly, like reference numbers have been used to indicate similar, if not identical, features. The SSSV 1200 of FIGS. 12A through 16C differs, for the most part, from the SSSV 700 of FIGS. 7A through 11C, in that the SSSV 1200 employs an axial brake portion 1250 having one or more collet teeth 1284 as the collet engaging profile, and one or more flow tube teeth shaped profiles 1244 as the reciprocal flow tube engaging profile. In this embodiment, the one or more collet teeth 1284 are configured to engage with the reciprocal one or more flow tube teeth shaped profiles 1244 when the electromagnet 260 is energized, the target 270 is in the axially proximal position and the collet 280 is in the radially compressed state, for example to hold the flow tube 240 in the flow state.

Figure 17A:
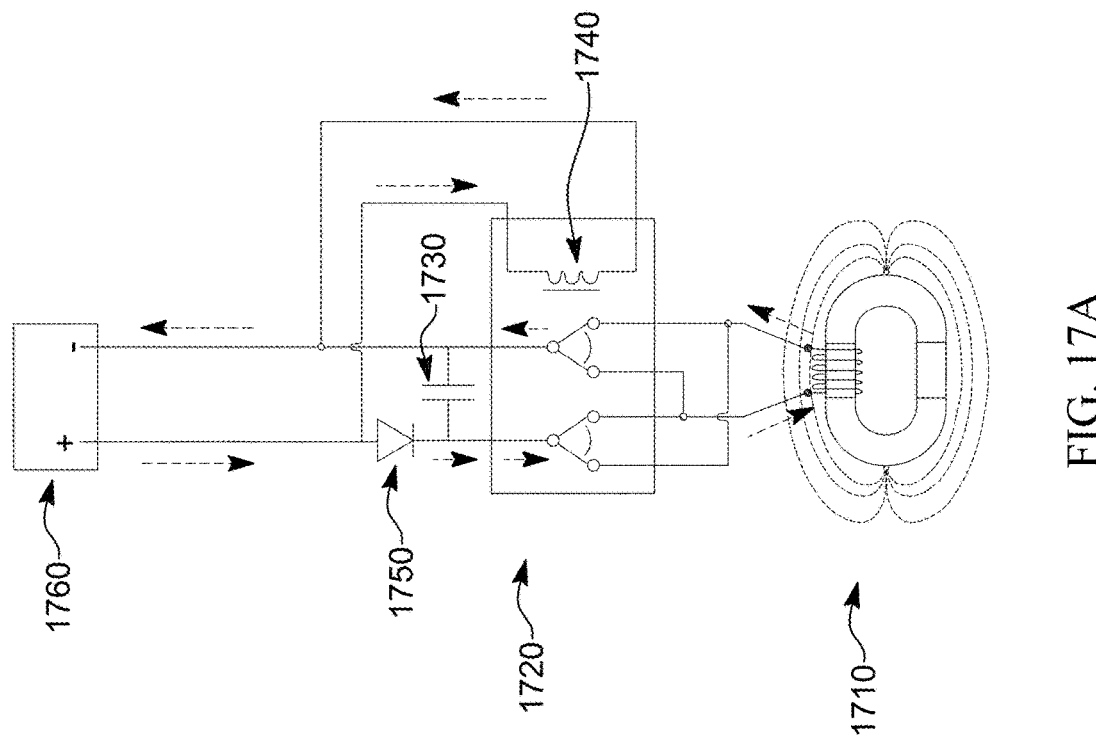
FIGS. 17A and 17B illustrate various different operational states of a magnet designed, manufactured and/or operated according to one or more embodiments of the disclosure.
Figure 17B:
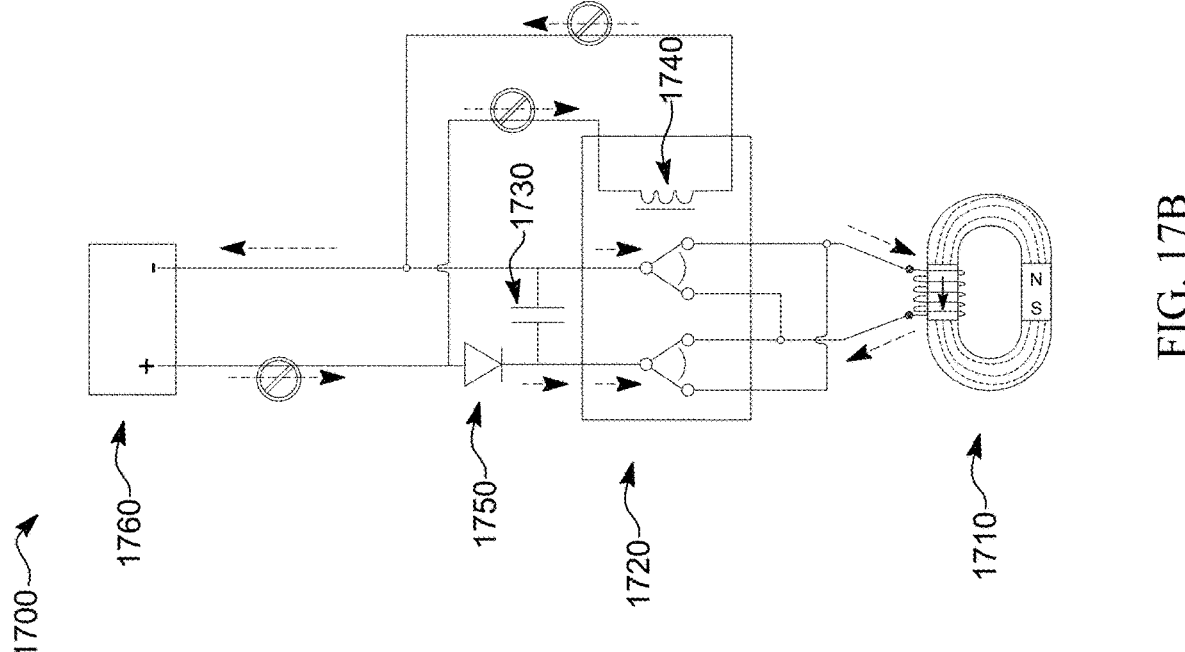

Turning to FIGS. 17A and 17B, illustrated are various different operational states of a magnet 1700 designed, manufactured and/or operated according to one or more embodiments of the disclosure. As discussed above, the magnet 1700 may be designed for use with an SSSV. Specifically, the magnet 1700 may be designed for use with any style of SSSV and remain within the scope of the disclosure, including the SSSVs discussed above with regard to FIGS. 1 through 16C. Nevertheless, in at least one other embodiment, the magnet 1700 could be used with any SSSV that includes: 1) a housing including a central bore extending axially through the housing, the central bore configured to convey subsurface production fluids there through; 2) a valve disposed proximate a downhole end of the central bore; 3) a flow tube disposed in the central bore and configured to move between a closed state and a flow state to engage or disengage the valve to determine a flow condition of the subsurface production fluids through the central bore; and 4) a target associated with another of the flow tube or the housing. The magnet 1700, in at least one embodiment, is configured to axially couple with a target when in the ON state. The magnet 1700, in at least one other embodiment, is configured to radially couple with a target when in the ON state.

The magnet 1700, in the illustrated embodiment, includes an electropermanent magnet 1710. Just about any type of electropermanent magnet 1710 may be used and remain within the scope of the present disclosure. For example, any electropermanent magnet including the aforementioned "hard" (high coercivity) magnetic material and "soft" (low coercivity) magnetic material may be used and remain within the scope of the disclosure.

The magnet 1700, in the illustrated embodiment, further includes a self-powered protection circuit 1720 coupled to the electropermanent magnet 1710. In accordance with one embodiment of the disclosure, the self-powered protection circuit 1720 is configured to switch the electropermanent magnet 1710 to the OFF state when the SSSV loses power. Many different types and/or styles of self-powered protection circuits may be employed and remain within the scope of the present disclosure, so long as then can switch the electropermanent magnet 1710 to the OFF state even when the SSSV loses power.

In the illustrated embodiment of FIGS. 17A and 17B, the self-powered protection circuit 1720 includes a downhole power source 1730 configured to provide a pulse of current to switch the electropermanent magnet 1710 to the OFF state when the SSSV loses power. In the illustrated embodiment, the downhole power source 1730 is a capacitor (e.g., a capacitor that is continually charged when the SSSV has power). In yet another embodiment, the downhole power source 1730 is a battery, or other currently known or subsequently discovered downhole power source.

In the illustrated embodiment of FIGS. 17A and 17B, the self-powered protection circuit 1720 further includes a switching circuit 1740 positioned between the downhole power source 1730 and the electropermanent magnet 1710. In this embodiment, the switching circuit 1740 is configured to switch the electropermanent magnet 1710 to the OFF state when the SSSV loses power. In at least one embodiment, such as that shown, the switching circuit 1740 is a relay circuit, the relay circuit configured to keep the electropermanent magnet 1710 in the ON state when the SSSV has power, but configured to allow the electropermanent magnet

1710 to move to the OFF state when the SSSV loses power. In one or more embodiments, such as that show, the relay circuit is a double pole double throw relay switch.

In at least one embodiment, the self-powered protection circuit 1720 further includes a diode 1750 placed between the downhole power source 1730 and the switching circuit (e.g., relay circuit in FIGS. 17A and 17B). In this embodiment, the diode 1750 is configured prevent the downhole power source 1730 from powering the switching circuit 1740 (e.g., relay circuit in FIGS. 17A and 17B) when the SSSV loses power. Were the downhole power source 1730 able to continue to power the switching circuit 1740, then it would be difficult (e.g., if not impossible) for the self-powered protection circuit 1720 of FIGS. 17A and 17B to switch the electropermanent magnet 1710 to the OFF state when the SSSV loses power.

FIG. 17A illustrates the magnet 1700 in the ON state (e.g., when the SSSV has power). In the embodiment of FIG. 17A, a power source 1760 would provide the current necessary to switch the electropermanent magnet 1710 to the ON state. While it is not required that the electropermanent magnet 1710 continually receive power from the power source 1760, it is desirable (e.g., if not necessary) that the switching circuit 1740 and the downhole power source 1730 continually receive power from the power source 1760 (e.g., so long at the SSSV has not lost power).

FIG. 17B illustrates the magnet 1700 in the OFF state (e.g., after the SSSV has lost power). Once the magnet 1700 loses power (e.g., surface power), and thus the power source 1760 no longer provides power to the switching circuit 1740, the switching circuit 1740 (e.g., relay circuit) would turn off and thus reverse the poles as shown in FIG. 17B. The downhole power source 1730, in this embodiment the capacitor, would then apply a current to the electropermanent magnet 1710, thereby reversing the poles on the electropermanent magnet 1710 and moving it to the OFF state. With the electropermanent magnet 1710 in the OFF state, the SSSV would be allowed to move back to its closed state, as discussed above.

It should be noted that the self-powered protection circuit 1720 may be located downhole proximate the SSSV, or in an alternative embodiment could be placed uphole or downhole of the SSSV, including at the surface of the wellbore. Similarly, a portion of the self-powered protection circuit 1720 may be placed proximate the SSSV, and another portion of the self-powered protection circuit 1720 could be placed uphole or downhole of the SSSV, including at the surface of the wellbore.

Aspects disclosed herein include:

A. An SSSV, the SSSV including: 1) a housing including a central bore extending axially through the housing, the central bore configured to convey subsurface production fluids there through; 2) a valve disposed proximate a downhole end of the central bore; 3) a flow tube disposed in the central bore and configured to move between a closed state and a flow state to engage or disengage the valve to determine a flow condition of the subsurface production fluids through the central bore; 4) an electromagnet fixedly coupled to the housing; 5) a target positioned proximate the electromagnet, the target configured to remain in an axially distal position when the electromagnet is not energized and be axially drawn toward and held in an axially proximal position by the electromagnet when the electromagnet is energized; and 6) a radially compressible member located radially between the flow tube and the housing, the radially compressible member engageable with the target and configured to move between: a) a radially extended state when the electromagnet is not energized and the target is in the axially distal position to allow the flow tube to move between the closed state and the open state; and b) a radially compressed state when the electromagnet is energized and the target is in the axially proximal position to hold the flow tube in the flow state.

B. A well system, the well system including: 1) a wellbore extending through one or mor subterranean formations; 2) an SSSV positioned within the wellbore, the SSSV including: a) a housing including a central bore extending axially through the housing, the central bore configured to convey subsurface production fluids there through; b) a valve disposed proximate a downhole end of the central bore; c) a flow tube disposed in the central bore and configured to move between a closed state and a flow state to engage or disengage the valve to determine a flow condition of the subsurface production fluids through the central bore; d) an electromagnet fixedly coupled to the housing; 3) a target positioned proximate the electromagnet, the target configured to remain in an axially distal position when the electromagnet is not energized and be axially drawn toward and held in an axially proximal position by the electromagnet when the electromagnet is energized; and f) a radially compressible member located radially between the flow tube and the housing, the radially compressible member engageable with the target and configured to move between: i) a radially extended state when the electromagnet is not energized and the target is in the axially distal position to allow the flow tube to move between the closed state and the open state; and ii) a radially compressed state when the electromagnet is energized and the target is in the axially proximal position to hold the flow tube in the flow state.

C. A method, the method including: 1) forming a wellbore through one or more subterranean formations; and 2) positioning an SSSV in the wellbore, the SSSV including: a) a housing including a central bore extending axially through the housing, the central bore configured to convey subsurface production fluids there through; b) a valve disposed proximate a downhole end of the central bore; c) a flow tube disposed in the central bore and configured to move between a closed state and a flow state to engage or disengage the valve to determine a flow condition of the subsurface production fluids through the central bore; d) an electromagnet fixedly coupled to the housing; c) a target positioned proximate the electromagnet, the target configured to remain in an axially distal position when the electromagnet is not energized and be axially drawn toward and held in an axially proximal position by the electromagnet when the electromagnet is energized; and f) a radially compressible member located radially between the flow tube and the housing, the radially compressible member engageable with the target and configured to move between: i) a radially extended state when the electromagnet is not energized and the target is in the axially distal position to allow the flow tube to move between the closed state and the open state; and ii) a radially compressed state when the electromagnet is energized and the target is in the axially proximal position to hold the flow tube in the flow state.

D. A magnet for use with an SSSV, the magnet including: 1) an electropermanent magnet; and 2) a self-powered protection circuit coupled to the electropermanent magnet, the self-powered protection circuit configured to switch the electropermanent magnet to the OFF state when the SSSV loses power.

E. An SSSV, the SSSV including: 1) a housing including a central bore extending axially through the housing, the central bore configured to convey subsurface production fluids there through; 2) a valve disposed proximate a downhole end of the central bore; 3) a flow tube disposed in the central bore and configured to move between a closed state and a flow state to engage or disengage the valve to determine a flow condition of the subsurface production fluids through the central bore; 4) an electropermanent magnet associated with one of the housing or the flow tube; 5) a target associated with another of the flow tube or the housing, the electropermanent magnet configured to: a) couple with the target when the electropermanent magnet is in an ON state, to hold the flow tube in the flow state; and b) decouple from the target when the electropermanent magnet is in an OFF state, to allow the flow tube to return from the flow state to the closed state; and 6) a self-powered protection circuit coupled to the electropermanent magnet, the self-powered protection circuit configured to switch the electropermanent magnet to the OFF state when the SSSV loses power.

F. A well system, the well system including: 1) a wellbore extending through one or mor subterranean formations; 2) an SSSV positioned within the wellbore, the SSSV including: a) a housing including a central bore extending axially through the housing, the central bore configured to convey subsurface production fluids there through; b) a valve disposed proximate a downhole end of the central bore; c) a flow tube disposed in the central bore and configured to move between a closed state and a flow state to engage or disengage the valve to determine a flow condition of the subsurface production fluids through the central bore; d) an electropermanent magnet associated with one of the housing or the flow tube; e) a target associated with another of the flow tube or the housing, the electropermanent magnet configured to: i) couple with the target when the electropermanent magnet is in an ON state, to hold the flow tube in the flow state; and ii) decouple from the target when the electropermanent magnet is in an OFF state, to allow the flow tube to return from the flow state to the closed state; and f) a self-powered protection circuit coupled to the electropermanent magnet, the self-powered protection circuit configured to switch the electropermanent magnet to the OFF state when the SSSV loses power.

G. A method, the method including: 1) forming a wellbore through one or more subterranean formations; and 2) positioning an SSSV in the wellbore, the SSSV including: a) a housing including a central bore extending axially through the housing, the central bore configured to convey subsurface production fluids there through; b) a valve disposed proximate a downhole end of the central bore; c) a flow tube disposed in the central bore and configured to move between a closed state and a flow state to engage or disengage the valve to determine a flow condition of the subsurface production fluids through the central bore; d) an electropermanent magnet associated with one of the housing or the flow tube; e) a target associated with another of the flow tube or the housing, the electropermanent magnet configured to: i) couple with the target when the electropermanent magnet is in an ON state, to hold the flow tube in the flow state; and ii) decouple from the target when the electropermanent magnet is in an OFF state, to allow the flow tube to return from the flow state to the closed state; and f) a self-powered protection circuit coupled to the electropermanent magnet, the self-powered protection circuit configured to switch the electropermanent magnet to the OFF state when the SSSV loses power.

Aspects A, B, C, D, E, F and G may have one or more of the following additional elements in combination: Element 1: wherein the radially compressible member is a collet, and further wherein the target includes an angled target surface and the collet includes a reciprocal angled collet surface, the angled target surface configured to slide upon the reciprocal angled collet surface as the electromagnet is energized to move the collet to the radially compressed state. Element 2: wherein the radially compressible member has a radially compressible member friction surface along a radially interior surface thereof and the flow tube has a reciprocal flow tube friction surface along a radially exterior surface thereof, the radially compressible member friction surface configured to engage with the reciprocal flow tube friction surface when the electromagnet is energized, the target is in the axially proximal position and the radially compressible member is in the radially compressed state to hold the flow tube in the flow state. Element 3: wherein the radially compressible member has a radially compressible member engaging profile along a radially interior surface thereof and the flow tube has a reciprocal flow tube engaging profile along a radially exterior surface thereof, the radially compressible member engaging profile configured to engage with the reciprocal flow tube engaging profile when the electromagnet is energized, the target is in the axially proximal position and the radially compressible member is in the radially compressed state to hold the flow tube in the flow state. Element 4: wherein the radially compressible member engaging profile is one or more radially compressible member teeth and the flow tube engaging profile is one or more flow tube teeth shaped profiles. Element 5: further including a safety mechanism, the safety mechanism configured to prevent the radially compressible member from restricting movement of the flow tube unless the flow tube is in the flow state. Element 6: wherein the safety mechanism is an electromagnet safety mechanism, the electromagnet safety mechanism configured to prevent the electromagnet from being energized unless the flow tube is in the flow state. Element 7: further including a return mechanism coupled to the target, the return mechanism configured to return the target to the axially distal position when the electromagnet is not energized. Element 8: wherein the return mechanism is a spring. Element 9: wherein the radially extended state is a first compressed state and the radially compressed state is a second more compressed state. Element 10: wherein the self-powered protection circuit includes a downhole power source configured to provide a pulse of current to switch the electropermanent magnet to the OFF state when the SSSV loses power. Element 11: wherein the downhole power source is a capacitor. Element 12: wherein the downhole power source is a battery. Element 13: further including a switching circuit positioned between the downhole power source and the electropermanent magnet, the switching circuit configured to switch the electropermanent magnet to the OFF state when the SSSV loses power. Element 14: wherein the switching circuit is a relay circuit, the relay circuit configured to keep the electroper-manent magnet in the ON state when the SSSV has power, but configured to allow the electropermanent magnet to move to the OFF state when the SSSV loses power. Element 15: further including a diode placed between the downhole power source and the relay circuit, the diode configure prevent the downhole power source from powering the relay circuit when the SSSV loses power. Element 16: wherein the relay circuit is a double pole double throw relay switch. Element 17: wherein the electropermanent magnet is con-figured to axially couple with a target when the electroper-manent magnet is in the ON state. Element 18: wherein the electropermanent magnet is configured to radially couple with a target when the electropermanent magnet is in the ON state.

Those skilled in the art to which this application relates will appreciate that other and further additions, deletions, substitutions and modifications may be made to the described embodiments.

What is claimed is:

1. A magnet for use with a subsurface safety valve (SSSV), comprising:
   an electropermanent magnet; and
   a self-powered protection circuit coupled to the electrop-ermanent magnet, the self-powered protection circuit configured to switch the electropermanent magnet to an OFF state when the SSSV loses power, wherein the self-powered protection circuit includes a downhole power source configured to provide a pulse of current to switch the electropermanent magnet to the OFF state when the SSSV loses power.

2. The magnet as recited in claim 1, wherein the downhole power source is a capacitor.

3. The magnet as recited in claim 1, wherein the downhole power source is a battery.

4. The magnet as recited in claim 1, further including a switching circuit positioned between the downhole power source and the electropermanent magnet, the switching circuit configured to switch the electropermanent magnet to an OFF state when the SSSV loses power.

5. The magnet as recited in claim 4, wherein the switching circuit is a relay circuit, the relay circuit configured to keep the electropermanent magnet in the ON state when the SSSV has power, but configured to allow the electropermanent magnet to move to the OFF state when the SSSV loses power.

6. The magnet as recited in claim 5, further including a diode placed between the downhole power source and the relay circuit, the diode configure prevent the downhole power source from powering the relay circuit when the SSSV loses power.

7. The magnet as recited in claim 5, wherein the relay circuit is a double pole double throw relay switch.

8. The magnet as recited in claim 1, wherein the elec-tropermanent magnet is configured to axially couple with a target when the electropermanent magnet is in the ON state.

9. The magnet as recited in claim 1, wherein the elec-tropermanent magnet is configured to radially couple with a target when the electropermanent magnet is in the ON state.

10. A subsurface safety valve (SSSV), comprising:
    a housing including a central bore extending axially through the housing, the central bore configured to convey subsurface production fluids there through;
    a valve disposed proximate a downhole end of the central bore;
    a flow tube disposed in the central bore and configured to move between a closed state and a flow state to engage or disengage the valve to determine a flow condition of the subsurface production fluids through the central bore;
    an electropermanent magnet associated with one of the housing or the flow tube;
    a target associated with another of the flow tube or the housing, the electropermanent magnet configured to:
       couple with the target when the electropermanent mag-net is in an ON state, to hold the flow tube in the flow state; and
       decouple from the target when the electropermanent magnet is in an OFF state, to allow the flow tube to return from the flow state to the closed state; and
    a self-powered protection circuit coupled to the electrop-ermanent magnet, the self-powered protection circuit configured to switch the electropermanent magnet to the OFF state when the SSSV loses power, wherein the self-powered protection circuit includes a downhole power source configured to provide a pulse of current to switch the electropermanent magnet to the OFF state when the SSSV loses power.

11. The SSSV as recited in claim 10, wherein the down-hole power source is a capacitor.

12. The SSSV as recited in claim 10, wherein the down-hole power source is a battery.

13. The SSSV as recited in claim 10, further including a switching circuit positioned between the downhole power source and the electropermanent magnet, the switching circuit configured to switch the electropermanent magnet to the OFF state when the SSSV loses power.

14. The SSSV as recited in claim 13, wherein the switch-ing circuit is a relay circuit, the relay circuit configured to keep the electropermanent magnet in the ON state when the SSSV has power, but configured to allow the electroperma-nent magnet to move to the OFF state when the SSSV loses power.

15. The SSSV as recited in claim 14, further including a diode placed between the downhole power source and the relay circuit, the diode configure prevent the downhole power source from powering the relay circuit when the SSSV loses power.

16. The SSSV as recited in claim 10, wherein the elec-tropermanent magnet is fixedly coupled to the housing and the target is fixedly coupled to the flow tube.

17. The SSSV as recited in claim 16, wherein the elec-tropermanent magnet is configured to axially couple with the target when the electropermanent magnet is in the ON state, to hold the flow tube in the flow state.

18. The SSSV as recited in claim 16, wherein the elec-tropermanent magnet is configured to radially couple with the target when the electropermanent magnet is in the ON state, to hold the flow tube in the flow state.

19. A well system, comprising:
    a wellbore extending through one or mor subterranean formations;
    a subsurface safety valve (SSSV) an SSSV positioned within the wellbore, the SSSV including:
       a housing including a central bore extending axially through the housing, the central bore configured to convey subsurface production fluids there through;
       a valve disposed proximate a downhole end of the central bore;
       a flow tube disposed in the central bore and configured to move between a closed state and a flow state to engage or disengage the valve to determine a flow condition of the subsurface production fluids through the central bore;

an electropermanent magnet associated with one of the housing or the flow tube;

a target associated with another of the flow tube or the housing, the electropermanent magnet configured to:

couple with the target when the electropermanent magnet is in an ON state, to hold the flow tube in the flow state; and decouple from the target when the electropermanent magnet is in an OFF state, to allow the flow tube to return from the flow state to the closed state; and a self-powered protection circuit coupled to the electropermanent magnet, the self-powered protection circuit configured to switch the electropermanent magnet to the OFF state when the SSSV loses power, wherein the self-powered protection circuit includes a downhole power source configured to provide a pulse of current to switch the electropermanent magnet to the OFF state when the SSSV loses power.

20. The well system as recited in claim 19, wherein the downhole power source is a capacitor.

21. The well system as recited in claim 19, wherein the downhole power source is a battery.

22. The well system as recited in claim 19, further including a switching circuit positioned between the downhole power source and the electropermanent magnet, the switching circuit configured to switch the electropermanent magnet to the OFF state when the SSSV loses power.

23. The well system as recited in claim 22, wherein the switching circuit is a relay circuit, the relay circuit configured to keep the electropermanent magnet in the ON state when the SSSV has power, but configured to allow the electropermanent magnet to move to the OFF state when the SSSV loses power.

24. The well system as recited in claim 23, further including a diode placed between the downhole power source and the relay circuit, the diode configure prevent the downhole power source from powering the relay circuit when the SSSV loses power.

25. The well system as recited in claim 19, wherein the electropermanent magnet is fixedly coupled to the housing and the target is fixedly coupled to the flow tube.

26. The well system as recited in claim 25, wherein the electropermanent magnet is configured to axially couple with the target when the electropermanent magnet is in the ON state, to hold the flow tube in the flow state.

27. The well system as recited in claim 25, wherein the electropermanent magnet is configured to radially couple with the target when the electropermanent magnet is in the ON state, to hold the flow tube in the flow state.

28. A method, comprising:

forming a wellbore through one or more subterranean formations; and positioning an SSSV in the wellbore, the SSSV including:

a housing including a central bore extending axially through the housing, the central bore configured to convey subsurface production fluids there through;

a valve disposed proximate a downhole end of the central bore;

a flow tube disposed in the central bore and configured to move between a closed state and a flow state to engage or disengage the valve to determine a flow condition of the subsurface production fluids through the central bore;

an electropermanent magnet associated with one of the housing or the flow tube;

a target associated with another of the flow tube or the housing, the electropermanent magnet configured to:

couple with the target when the electropermanent magnet is in an ON state, to hold the flow tube in the flow state; and decouple from the target when the electropermanent magnet is in an OFF state, to allow the flow tube to return from the flow state to the closed state; and a self-powered protection circuit coupled to the electropermanent magnet, the self-powered protection circuit configured to switch the electropermanent magnet to the OFF state when the SSSV loses power wherein the self-powered protection circuit includes a downhole power source configured to provide a pulse of current to switch the electropermanent magnet to the OFF state when the SSSV loses power.

* * * * *